United States Patent
Holzer et al.

(10) Patent No.: US 12,488,401 B2
(45) Date of Patent: Dec. 2, 2025

(54) FAST SIMULTANEOUS FEASIBILITY TEST WITH ELECTRICAL POWER GRID PERTURBATIONS OVER STATES AND CONTINGENCIES

(71) Applicant: Battelle Memorial Institute, Richland, WA (US)

(72) Inventors: Jesse T. Holzer, Kennewick, WA (US); Yonghong Chen, Zionsville, IN (US); Zhongyu Wu, Carmel, IN (US); Feng Pan, Sugar Land, TX (US); Arun Veeramany, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 835 days.

(21) Appl. No.: 17/845,239

(22) Filed: Jun. 21, 2022

(65) Prior Publication Data
US 2023/0410228 A1    Dec. 21, 2023

(51) Int. Cl.
G06Q 50/06    (2024.01)
H02J 3/00    (2006.01)

(52) U.S. Cl.
CPC .......... *G06Q 50/06* (2013.01); *H02J 3/0012* (2020.01)

(58) Field of Classification Search
CPC .............................. G06Q 50/06; H02J 3/0012
See application file for complete search history.

(56) References Cited

U.S. PATENT DOCUMENTS

| | | | |
|---|---|---|---|
| 7,058,115 B2 | 6/2006 | Castelain | |
| 7,343,360 B1 | 3/2008 | Ristanovic et al. | |
| 9,552,007 B2 | 1/2017 | Ditlow et al. | |
| 11,418,030 B2* | 8/2022 | Holzer | H02J 3/003 |
| 2009/0063680 A1 | 3/2009 | Bridges et al. | |
| 2013/0226482 A1 | 8/2013 | Sun et al. | |
| 2014/0039702 A1 | 2/2014 | Ilic et al. | |
| 2017/0229870 A1 | 8/2017 | Singh et al. | |
| 2020/0091767 A1 | 3/2020 | Khodaei et al. | |

(Continued)

OTHER PUBLICATIONS

Alsac et al., "Sparsity-Oriented Compensation Methods for Modified Network Solutions", IEEE Transactions on Power Apparatus and Systems, vol. PAS-102, No. 5, pp. 1050-1060 (May 1983).

(Continued)

*Primary Examiner* — Oleg Survillo
(74) *Attorney, Agent, or Firm* — Klarquist Sparkman, LLP

(57) ABSTRACT

Fast simultaneous feasibility testing (SFT) for management of an electrical power grid is achieved through various innovations. The computation problem relates to evaluation of candidate solutions for external power flows into a power grid, with respect to predetermined constraints and contingencies. A perturbation approach with precomputation is extended to encompass grid states (e.g. time periods) in addition to contingencies. Advantages derive from: fewer factorizations or inversions of large matrices; decoupling of state-dependent and contingency-dependent perturbations, leaving relatively few perturbations jointly dependent on both state and contingency; or making approximations by discarding small jointly dependent terms. Significant computation reductions allow a single workstation to perform SFT for 36 hours of a day-ahead cycle.

23 Claims, 15 Drawing Sheets

(56) References Cited

U.S. PATENT DOCUMENTS

2020/0350762 A1* 11/2020 Holzer .................. G06Q 50/06
2022/0229459 A1* 7/2022 Liu ........................ G06Q 50/06

OTHER PUBLICATIONS

Chan et al., "Partial Matrix Refactorization", IEEE Transactions on Power Systems, vol. PWRS-1, No. 1, pp. 193-199 (Feb. 1986).

Holzer et al., "Fast evaluation of security constraints in a security constrained unit commitment algorithm", INFORMS Annual Meeting, Seattle, WA, pp. 1-15 (Oct. 2019).

Holzer et al., "Fast Simultaneous Feasibility Test for Security Constrained Unit Commitment", FERC Technical Conference on Increasing Market and Planning Efficiency through Improved Software, 8 pages (Jun. 22, 2021).

Holzer et al., "HIPPO Concurrent Optimizer—Enhanced Simultaneous Feasibility Test (SFT) and Migration to Private Cloud". FERC Technical Conference on Increasing Market and Planning Efficiency through Improved Software and available from https://www.ferc.gov/media/t2-holzer , pp. 1-21 (Jun. 22, 2021).

Pan et al., "HIPPO—A Concurrent Optimizer for Solving Day-ahead Security Constrained Unit Commitment Problem", FERC Technical Conference, 28 pages, (Jun. 2019).

Shafie-Khah et al., "Fast and accurate solution for the SCUC problem in large-scale power systems using adapted binary programming and enhanced dual neural network", Elsevier Ltd., pp. 1-24 (Sep. 2013).

Tesfatsion, "Power Trading Subject to Transmission Constraints", EE/Econ 458, Syllabus Section V.C, pp. 1-70 (Nov. 2011).

Wu et al., "Security-Constrained Unit Commitment Based on a Realizable Energy Delivery Formulation", Mathematical Problems in Engineering, vol. 2012, Article ID 178193, pp. 1-22 (Feb. 2012).

Zhai et al., "Fast Identification of Inactive Security Constraints in SCUC Problems", IEEE Transactions on Power Systems, vol. 25, No. 4, pp. 1946-1954 (Nov. 2010).

Zhu et al., "Flexible Simultaneous Feasibility Test in Energy Market", IEEE, 7 pages (Jul. 2010).

Zimmerman et al., "Matpower User's Manual Version 7.0", Power Systems Engineering Research Center, pp. 1-250 (Jun. 2019).

* cited by examiner

FAST SIMULTANEOUS FEASIBILITY TEST WITH ELECTRICAL POWER GRID PERTURBATIONS OVER STATES AND CONTINGENCIES

ACKNOWLEDGMENT OF GOVERNMENT SUPPORT

This invention was made with Government support under Contract DE-AC05-76RL01830 awarded by the U.S. Department of Energy. The Government has certain rights in the invention.

BACKGROUND

Simultaneous Feasibility Test (SFT) is an important tool for modern management of electric power grids. SFT is used to evaluate a proposed configuration of power injections into the grid, to verify that security constraints can be satisfied and that the proposed configuration can be safely implemented within the physical limitations of the power grid. However, because of the scale of modern power grids, with tens of thousands of nodes, and the sizes of data structures used, conventional technologies are computationally challenged to provide solutions in a practical amount of computation time. Moreover, grid management can be performed over multiple time periods. Determining solutions over multiple time periods in one planning cycle can further strain available computing resources. Accordingly, there is ample opportunity for improved technology for SFT.

SUMMARY

Methods and applications are disclosed for fast Simultaneous Feasibility Test (SFT) evaluation of candidate solutions of a Security-Constrained Unit Commitment (SCUC) problem for an electrical power grid. In some embodiments, innovative formulation of the computation required to address the underlying physical problem and/or innovative organization of the computation provide significantly more efficient computation of SFT as compared to conventional technology. Particularly, the number of computation operations, the amount of memory storage required, and the required computation time can all be significantly reduced. An exemplary innovation includes extending a perturbation approach to encompass multiple states of the power grid, in addition to contingencies, to dramatically reduce a required number of large-matrix factorizations or inversions. Another innovation includes decoupling state perturbations from contingency perturbations to the extent possible, greatly reducing a number of perturbations jointly dependent on state and contingency and the associated computational burden. A further innovation includes selective discarding of small jointly dependent perturbations to further reduce the total computations required across multiple states. Where suitable, any of these innovations can be combined with exemplary features including: precomputing matrices, using sparse matrices, replacing operations on high-rank matrices with operations on matrices of lower rank, organizing matrix operations to reduce the number of multiplication operations required, consolidating two-dimensional arrays into three-dimensional arrays, setting up parts of the computation based on power injection at transactional nodes of a power grid rather than all nodes including infrastructure nodes, or eliminating branches that can be shown to have no violations, in any combination. In turn, fast SFT computation enables innovations in deployment, allowing SFT to be called more frequently from a SCUC solver, leading to a significant increase in overall efficiency and better quality results. The fast SFT can be provided as a service shared by multiple SCUC solvers or integrated with Security-Constrained Economic Dispatch (SCED).

According to one aspect, the disclosed technologies can be implemented as computer-readable media containing first, second, and third instructions which, when executed by one or more hardware processors, cause certain operations to be performed for feasibility testing of a plurality T of candidate solutions for an electrical power grid. The candidate solutions are indexed by T respective states of the electrical power grid. Each of the candidate solutions comprises a vector of power injections at transactional nodes of the electrical power grid. The first instructions obtain one or more first factors of an inverse of a reference bus admittance matrix of the electrical power grid. The second instructions compute, for each of the T states, right and left power flow perturbation factor arrays, based on (a) the one or more first factors, and (b) one or more perturbation definition arrays characterizing the respective state. The third instructions combine the right and left power flow perturbation factor arrays with the candidate solutions, to determine violations of one or more component limits in the electrical power grid at corresponding states. The third instructions also cause a list of the violations to be outputted.

The foregoing and other objects, features, and advantages of the disclosed innovations will become more apparent from the following detailed description, which proceeds with reference to the accompanying figures.

DETAILED DESCRIPTION

I. Introduction

Figure 1:
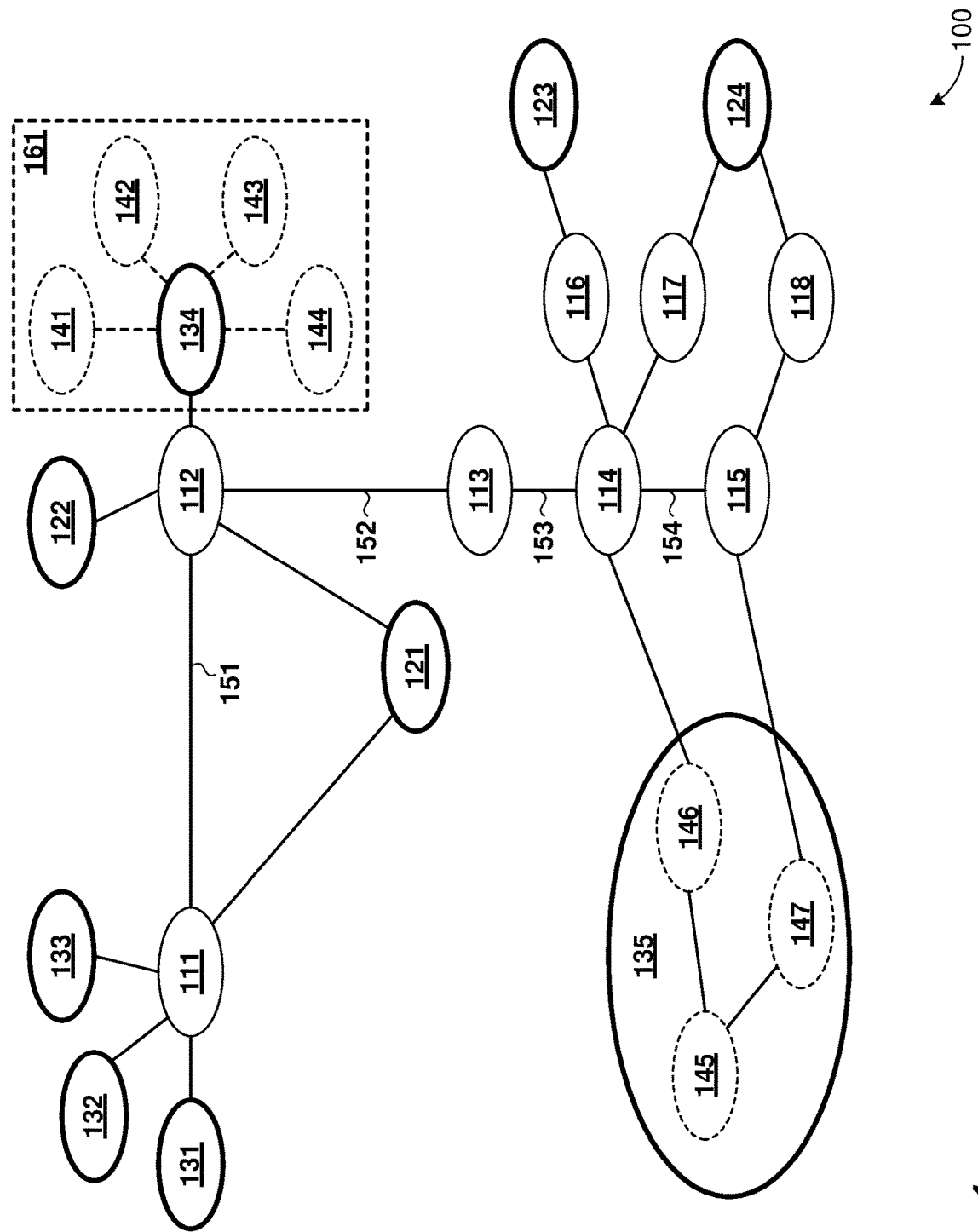
FIG. 1 is a diagram of an example power grid to which the disclosed technologies can be applied.

An electrical power grid can be modeled as a graph. When power is injected at certain points (e.g. a power station) or extracted at certain points (e.g. factories or residential neighborhoods), the resulting power flows throughout the network can be solved by network analysis techniques. However, the components of a power grid are physical entities with physical limitations (e.g. a maximum current rating), and operation of the grid requires that the physical constraints be met. The analysis thus far is dubbed a "base case" analysis. Additionally, a fault in a power grid can cause power flows in the grid to redistribute instantly, which can lead to further faults, in a cascade. To protect against such catastrophic scenarios, the power grid can be analyzed in various contingencies, to ensure that when one or a few components of the grid fail, the redistributed power flows remain within safe limits. SFT can be used as a tool for checking constraints under both base case and contingencies. Further, SFT can be performed for multiple states of the grid. The states can correspond to different time periods, and the grid can vary from state to state, e.g. as equipment is introduced, reconfigured, or taken out of service.

SFT can also be implemented with a matrix formulation, for example with matrices for power lines, other matrices for nodes (e.g. sources, loads, substations), further matrices for defining relationships between the power lines and the nodes, and so forth. However, because a typical power grid can have tens of thousands of nodes (sometimes over $10^4$ nodes), together with a comparable number of power lines, the associated data structures can be very large. Moreover, operations such as matrix multiplication or matrix inversion can scale as $n^3$, meaning that $\sim 10^{12}$ operations could be required for just one operation: taking the inverse of a $10^4 \times 10^4$ matrix. This is a significant challenge even with a cluster of gigahertz processors, and there can be dozens or hundreds of matrix operations in a single SFT evaluation. Still further, the problem served by SFT, namely Security-Constrained Unit Commitment (SCUC), is itself an NP-hard problem, meaning that there is no known polynomial time algorithm for finding an optimal solution. SCUC solvers apply different approaches to find a "good enough" solution in "good enough" time. SCUC has real-time requirements in that, for a day-ahead market, 24 separate solutions (and sometimes more) must be determined for 24 one-hour operating intervals, and SFT must fit within time budgets to meet these requirements. In fact, a day-ahead market often works with 36 one-hour intervals, covering a day and a half. The disclosed technologies can also be applied for 15-minute markets, requiring 96 intervals to be solved for each one-day period. The disclosed technologies can be applied to other market configurations as well.

In fact, because of the unfavorable scaling with grid size, and recent trends for modern power grids to have increasing numbers of participants (e.g. progressively increasing penetration of distributed generation resources), the SCUC+SFT computational problem is among an uncommon class of physical-world problems where the demand for computation has been increasing even faster than the performance of computers. The disclosed technologies directly address the scaling problem by using smaller matrices and better organized computation than conventional technologies. Further improvements can be obtained by aggregating SFT problems over different time periods and treating grid changes as perturbations.

The disclosed technologies have been tested against an earlier SFT solver, and have been found to offer speed-up by about a factor of 2. In tests, the earlier solver took about 904 seconds for precomputation of 36 states, while a disclosed solver using state perturbations took about 412 seconds. At run time, the earlier solver took about 1363 seconds to complete evaluation of 36 candidate solutions for respective time periods using 36 SFT instances, while the disclosed solver completed equivalent computation using a single SFT instance in 767 seconds. Such an improvement enhances the state of the art for computational aspects of modern power grid management. Not only does fast SFT free up time budgets for the main SCUC problem, but having fast SFT allows SFT to be called numerous times during a SCUC problem and enables new approaches for SCUC. For example, a SCUC solver can be guided by interim SFT evaluation results, even within a single-pass of a branch-and-bound search. Such improvements directly translate to improved operation of the power grid: "good enough" solutions can be replaced with superior or near-optimal solutions; and "best-that-was-found" solutions, which may not even satisfy all constraints and contingencies, can be replaced with secure solutions that do meet all constraint and contingency requirements. In varying examples, improvements can take the form of improved security for a given operating cost, or reducing operating cost for a particular level of security guarantee. For example, without an adequate security guarantee, a power grid operator can be required to default on a commitment to a generator or to a load, leading to a significant penalty. With the disclosed technologies, the incidence of penalties can be greatly reduced. Additional benefits are found at the system level, where memory requirements (for multiple time periods) can be reduced to a level feasible for a single computing system, and a single computing system can perform SFT computations previously requiring multiple systems.

In part, the disclosed technologies include several distinct techniques that contribute to the demonstrated performance improvements. Innovations in formulation include consolidating precomputation for multiple states, using respective perturbations for each state relative to a reference configuration of the grid, decoupling state and contingency perturbations to the extent possible, or setting up the computation based on power injection at just transactional nodes of a power grid rather than for all nodes including infrastructure nodes. In typical power grids, these innovations can drop array storage by about a factor of 10 or more. Innovations in organization of the computation include exemplary features of precomputing matrices, using sparse matrices, preferring low-rank to high-rank matrices, organizing matrix operations to reduce the number of multiplication operations required, consolidating two-dimensional arrays into three-dimensional arrays, eliminating branches that can be shown to have no contingency violations, treating successive time periods as perturbations of the electrical power grid, or storing power flow perturbation factor arrays as compact components. Such innovations, in varying combinations, directly lead to more efficient computation of SFT as compared to conventional technology. Particularly, the number of computation operations, the amount of memory storage required, the number of processors, and/or the required computation time can be reduced by respective factors of 10 or more.

In part, the disclosed technologies include distinct improvements to the SCUC solver environment in which SFT is deployed. One innovation is a single-pass branch-and-bound SCUC, with multiple SFT calls for respective candidate solutions. Another innovation is providing fast SFT as a service shared by multiple SCUC solvers. A further innovation is integration of SFT with a continuous refinement solver for a Security-Constrained Economic Dispatch (SCED) problem, for an improved optimization of SCUC and SCED in parallel.

These and other aspects of the disclosed technologies are described further herein.

II. Terminology

To facilitate review of the various embodiments, the following explanations of terms are provided. Occasionally, and where clear to a person of ordinary skill in the relevant art from the context, a term may also be used in a different meaning.

1. Electrical Power Grids

As used in this disclosure, an "electrical power grid" is a physical network for distribution of power between multiple participants. The participants can include one or more electrical power suppliers (dubbed "generators") such as power plants, including renewable or distributed energy sources, other grids; or energy storage facilities. The participants can also include one or more users of electricity (dubbed "loads") such as end users, including industrial, transportation, commercial, or residential users; aggregate users, such as municipal utilities; other grids; or energy storage facilities. The grid can include infrastructure such as power lines, substations, or switchgear, as well as facilities for interconnecting with participants or other grids. Some grids can be operated by Regional Transmission Organizations ("RTOs") or Independent System Operators ("ISOs"). Further terminology regarding power grids is introduced in the context of FIG. 1 below.

2. Examples of Physical Problems to be Addressed by the Disclosed Technology As used in this disclosure, "Security-Constrained Unit Commitment" ("SCUC") refers to a type of Unit Commitment ("UC") problem to be solved for managing an electrical power grid. In some examples, UC refers to allocating commitments and generation levels of multiple generators in a network to meet demands, typically for clearing bids in a future market such as a day-ahead market. However, to operate the power grid securely, i.e. within safe operating conditions of all grid components, additional constraints can be imposed, leading to the SCUC problem formulation. While some SCUC problems aim to determine generation levels under an assumption that all loads can be satisfied, this is not a requirement. In other SCUC problems, commitments and usage levels of loads can also be allocated. That is, a load can have all, none, or part of its bid satisfied in the market. Further, a SCUC problem can combine variable generators or loads (whose allocation is to be determined) with preset generators or loads (whose power transfer amounts are not subject to allocation). For example, some generators can have power transfer amounts determined by e.g., a long-term contract rather than by market clearing, and some loads can be committed either to a contract or to a clearing market price. However, non-allocated generators or loads can also impose power flows within the grid, and can be taken into account when analyzing security constraints.

SCUC problems for modern power grids can involve a large number of variables to be solved: thousands to hundreds of thousands of binary variables (e.g. commitments ("ON", "OFF") of various grid participants) and even more continuous variables (e.g. allocated amounts of power generation for generators, or power consumption of loads; as well as power flows through thousands to hundreds of thousands of power lines and connected equipment).

The number of constraints can be comparable to the number of power lines in a grid, commonly in the tens of thousands. Computation effort for SCUC can increase rapidly as more constraints are imposed, and in some examples the constraint testing can be separated out, partially or wholly, from the SCUC problem. For example, SCUC can be solved with a few critical constraints, and a candidate solution can be separately tested for compliance with the remaining (or, all) constraints, e.g. by SFT. In some disclosed examples, multiple candidate solutions for respective states of the grid can be tested concurrently.

As used in this disclosure, "mixed integer programming" ("MIP") is a formulation of an optimization problem over a set of variables, at least one of which is restricted to integer values. SCUC optimization can be defined in terms of an "objective function," wherein a goal of the optimization is to optimize (e.g. minimize or maximize) the objective function. Examples of objective functions can include, without limitation: total power losses in the power grid; a fraction of participants whose requirements (e.g. bids) are satisfied; a fraction of transaction bid amounts that are satisfied; a measure of total cost or total profit; or a measure of change from the determined solution of a previous market period. Commonly, SCUC can be formulated as a MIP with constraints that are linearly dependent on the variables ("linear constraints"), resulting in a "mixed integer linear programming" ("MILP") problem. Formulated as a MIP, SCUC can have binary commitments as integer variables, and generation levels as continuous variables. A set of respective values for the set of variables, that has integer values for all the integer variables, and that satisfies the constraints is dubbed an "integer feasible solution" or simply "feasible solution." As feasible solutions are unearthed during the optimization process, the current best (on the basis of the objective function) among discovered feasible solutions is dubbed the "incumbent solution."

As used in this disclosure, "branch-and-bound" is a technique for solving an optimization problem in which a solution space is represented as a tree and branches of the tree are successively evaluated. An initial evaluation of a branch can sometimes demonstrate that the optimal solution within that branch is inferior to the incumbent solution, and the optimization procedure can continue without further examination of the subtree of that branch, leading to efficiency of the technique. SCUC MIP problems can be solved by branch-and-bound, but this is not a requirement. Numerous other techniques to solve optimization problems are available, including without limitation genetic algorithms, simulated annealing and other stochastic methods, Boolean satisfiability, linear programming, or particle swarm optimization.

As used in this disclosure, "Simultaneous Feasibility Test" ("SFT") refers to a procedure for validating a candidate SCUC solution against constraints and contingencies. A candidate solution can be an integer feasible solution that is better than the current incumbent solution, but this is not a requirement. In certain examples, SFT can be called on candidate solutions that are not superior to the incumbent solution (for example, if the incumbent solution does not satisfy one or more constraints under the base case or contingencies), or even on all integer feasible solutions, optionally subject to some criterion.

As used in this disclosure, "limit" is a rated operating parameter of a power grid component, such as rated current for a transmission line (which can include both real and reactive power flow), or a kVA rating for a substation transformer. A "constraint" can be based on a limit, and can be expressed as an inequality, for example power flow in a particular branch should not exceed 30 MW. A "contingency" is a hypothetical state of the grid in which the topology or constraints of the grid have changed. A contingency can be a scenario of an outage, fault, or degradation in a power grid, such as a fault causing a switchgear component to trip, taking one or more power lines or node equipment out of service. Secure grid operations can involve protection against cascaded faults, so that if a given fault occurs, and the grid adjusts to its changed topology, the adjusted grid should remain within all constraints. A contingency can involve outage or degradation of a single power grid component, or multiple components. Contingencies can be predetermined for a given power grid, and the response of the grid to each contingency can also be predetermined prior to SFT on a given candidate solution. A constraint that is not satisfied in the base case, or in a contingency, is dubbed a "violation." A violation can be specified by an entity within the power grid (e.g. a branch) whose constraint is violated, and optionally an identifier of the contingency resulting in such violation. In some examples, a tuple reporting the violation can include a parameter value of the violation, such as a branch power flow (e.g. 35 MW), or the percentage of the violated parameter relative to its constraint (e.g. 130%). Commonly, a violation can occur when a candidate solution exceeds a rating or limit of a grid component. A limit can be equal to a rating, but this is not a requirement, and limits greater than or less than a component's rating can sometimes be used.

Depending on the depth of contingencies being evaluated, the number of contingencies can be comparable to the number of constraints (e.g. in the tens of thousands) for each time interval in the SCUC problem. Thus, SFT has been a formidable computing challenge. Given that clearing a day-ahead market requires analysis of 24 or 36 independent one-hour periods, a target time for complete SCUC+SFT computation of less than an hour has been challenging, particularly when a candidate solution can fail SFT, leading to multiple cycles of computation to arrive at a workable solution which, with conventional technologies, could still fail to satisfy all contingencies. With the variations and uncertainty introduced by penetration of renewable energy sources, the sub-hourly (e.g., 15-min) interval SCUC can require SFT support for 96 to 144 periods each day.

3. Computational Terminology

As used in this disclosure, "base case" refers to SFT parameters or analysis in the absence of any contingencies.

As used in this disclosure, the term "perturbation" is used in the context of SFT analysis of a contingency or changed state (e.g. between time periods), under an assumption that changes to the power grid topology are small. The changes to various quantities (commonly arrays) are referred to as perturbations. Similar mathematical treatments are applicable to state perturbations and contingency perturbations. A perturbation approach can be computationally efficient because it results in linear equations and allows linear system techniques to be applied. Some instances of computationally intensive operations, such as matrix inversion or factorization, can be eliminated. In examples, a formulation based on optimizing a Sherman-Morrison-Woodbury perturbation approach can be used. Because a state perturbation can affect the grid configuration, a given contingency can result in a violation in one state, but no violation in another state. To determine contingency violations in various states, disclosed examples apply a combination of state and contingency perturbations.

As used in this disclosure, a "call" is an invocation of one software module (e.g. a function, subroutine, a service, thread, process, or a stand-alone program) from another software module. The two software modules can be running under a shared operating system, or can be in different computing environments. The two software modules can have shared memory or storage space, or not. Upon completion of its task, a called module can "return" or communicate results to its calling software module. Data can be communicated in one or both of the call and return, by passing parameters, messages, shared memory objects, or shared storage objects, in any combination. For example, an SCUC solver can call an SFT solver, and pass a candidate solution with the call. Upon completion, the SFT solver can return violations or sensitivities to the SCUC solver. In some examples, the calling software module can block awaiting results of the call, while in other examples the calling software module can continue without blocking.

As used in this disclosure, the term "precompute" refers to operations performed once by a called software module (e.g. SFT), for multiple calls to the called software module. In varying examples, precompute operations can be called responsive to or prior to the first call to the called software module. Results of the precomputation that can be shared among multiple calls are dubbed "intermediate," and can be data structures such as matrices, arrays, or tuples, or other data items.

As used in this disclosure, terms like "optimum," "optimize," "maximum," "maximize," "minimum," or "minimize" refer to selection of one of a number of possible entities (e.g. configurations, values, or data structures) as having a superior property compared to others of the possible entities, according to some predetermined criterion. Any number of possible entities can be evaluated, even as few as two. Particularly, optimization requires neither perfection nor an infinite search. Due to discrete data representations and finite computation time, an optimization procedure can successfully terminate without finding an exact extremum.

4. Data Structures

As used in this disclosure, an "array" is an ordered arrangement of data fields in one, two, three, or more dimensions. Arrays of one and two dimensions are referred to as "vectors" and "matrices" respectively. The maximum number of elements or positions along each dimension is dubbed the "extent" or "length" of that dimension. The data fields in an array can variously have known values, or can be empty or unknown pending determination of such values. A data structure storing data fields of an array need not have the same structure as the logical structure of the underlying array. For example, a sparse 1000×1000 matrix with 8 non-zero elements can be accurately represented as eight triples, each triple containing the row and column indices of the corresponding element, along with its value. As a further example, an array of size E1×E2 can sometimes be stored as its transpose, of size E2×E1. An array is considered "sparse" if its number of non-zero elements is less than or equal to a predetermined threshold. For an array of N positions (that is, a 3×6 matrix can have N=3×6=18 positions), in various examples, the threshold for sparseness can be $0.5 \times N$, $0.1 \times N$, $0.01 \times N$, $\sqrt{N}$, or another value. A "slice" of a multi-dimensional array is a portion of the array resulting from assigning particular values to all except one or two of the array's indices. The indices held fixed are dubbed "fixed indices" and the remaining indices (index) are dubbed "floating indices (index)". To illustrate, a slice of a matrix can be a vector (e.g. row or column of the matrix), and a slice of an array having three or more dimensions can be a matrix or a vector.

Two or more N dimensional arrays having equal extent in N−1 dimensions, and extents E1, E2, . . . in the remaining ($N^{th}$) dimension, can be "stacked" adjacent to one another in the Nth dimension to form an array having extent in the Nth dimension of E1+E2+ . . . . An N−1 dimensional array is equivalent to an N dimensional array with extent 1 in the Nth dimension. The Nth dimension can be in any position, and need not be the last among the dimensions. To illustrate, a 3×5 matrix can be equivalent to a 1×3×5 array, a 3×1×5 array, or a 3×5×1 array, and accordingly, two such 3×5 matrices can be stacked to obtain a 2×3×5 array, a 3×2×5 array, or a 3×5×2 array respectively.

In some cases, it can be useful to stack matrices or vectors of different sizes to obtain an array. That is, two slices of an array, with same floating indices, can have same or different sizes. If all such slices are the same size, the array is dubbed a "regular array", otherwise the array is dubbed an "irregular array".

As used in this disclosure, a "tuple" is an ordered collection of a predetermined number of data fields. Tuples of size one, two, three, and four can be referred to as "singlets," "pairs," "triples," and "4-tuples" respectively.

As used in this disclosure, the "size" of an array or tuple is a tuple indicating the number of data fields it can contain along each dimension of the array or along the length of the tuple. Thus, the size of a matrix having two rows and three columns can be 2×3, and is different from the 3×2 size of a matrix with three rows and two columns. The size of a tuple is its length (i.e. a singlet). Thus, the size of a triple is three.

A "maximum size" of an array can likewise be specified as extents along various dimensions (e.g. 2×3×4×5). In the latter case, an array is within the maximum size if each dimension has extent less than or equal to the specified limit. In some examples, an N-dimensional array can be specified to have a maximum size of $E_1 \times E_2 \times \ldots \times E_M$ in M<N dimensions, meaning that any M dimensional slice of the array can fit within a structure having extents $E_1, E_2, \ldots E_M$ in M dimensions. Thus, if a maximum size is called out as 4×4, then a three-dimensional array 3×2×3 is within the maximum size, because its largest 2-dimensional slice is 3×3, while a 3×5×3 array exceeds the maximum size, because its largest 2-dimensional slice, 3×5, has a dimension of extent 5 which cannot fit within the 4×4 limit.

As used in this disclosure, the "rank" of an array is used synonymously with the extent of the array in a particular dimension under consideration. The term rank is also applied in the context of contingencies, to refer to a number of buses or branches that are affected in that contingency. Thus, a contingency k can have a bus rank ($sk^{bu}$) and a branch rank ($sk^{br}$), referring to the affected number of buses or branches respectively. Often, a given contingency rank sk will lead to matrices or arrays having an extent sk, and so the dual usage of the term "rank" can be consistent.

The following sections summarize some of the quantities and symbols used in this disclosure.

4.1 Sizes and Indices

In Table 1, quantities are described in the middle column, a symbol for the number of such quantities is listed in the left column, and a corresponding index is listed in the right column. To illustrate, K contingencies can be defined on a power grid, and index k can identify a particular one of the contingencies. Contingency k can be associated with $sk^{br}$ perturbed branches and $sk^{bu}$ perturbed buses.

TABLE 1

| Size | Description | Index |
|---|---|---|
| I* | All branches | — |
| I | Monitored branches | i |
| $I^{OK}$ | Branches where contingency currents are guaranteed not to exceed constraint | i |
| $I^{<>}$ | Branches that could have violations, complement of $I^{OK}$; $I^{OK} + I^{<>} = I$ | i |
| J | All bus nodes | j |
| K | Contingencies. Occasionally, K' and K'' are used for clarity, K' referring to contingencies having no overlap with state perturbations and K'' referring to contingencies overlapping with at least one state perturbation. Where used, K' + K'' = K. | k |
| N | Transactional nodes | n |
| T | States or Time Intervals | t |
| V | Violations | v |
| $sp^{br}$ $st^{br}$ $sk^{br}$ $stk^{br}$ | Perturbation branch rank (also simply "branch rank"), the number of branches perturbed under a perturbation p. A perturbation p can denote one or more of a contingency k, a state or time interval t, or a joint perturbation tk. Thus, sp∈{st, sk, stk} and similarly for other quantities. Where superscript br or bu is omitted, sp and similar quantities can be understood as pertaining to branches (e.g. $sp^{br}$) and optionally to buses (e.g. $sp^{bu}$). | i |
| $sp^{bu}$ $st^{bu}$ $sk^{bu}$ $stk^{bu}$ | Perturbation bus rank (also simply "bus rank"), the number of buses perturbed under a perturbation p, which can be a contingency k, a state or time interval t, or a joint perturbation tk. | j |
| S | Number of contingencies having a same value of either $sp^{br}$ or $sp^{bu}$ | — |

4.2 Base Case Data Structures

In Table 2, data structures are described in the right column, a symbol for the data structure is listed in the left column, and a usual size for the data structure is listed in the second column.

The third column lists a category of the data structure: "CC" identifies Configuration data structures that can be provided as inputs for a particular power grid or SCUC problem. "WW" data structures are temporary data structures that can facilitate computation, for example to reduce storage requirements or computation operations. "DD" identifies Data input specific to a particular SFT evaluation, commonly power injections or other parameters of a candidate solution. "II" identifies Intermediate data structures that can be precomputed and reused for multiple SFT evaluations on a single SCUC problem or on a common power grid.

"OO" identifies data structures that can be output or returned to a calling program. In some examples, certain of these data structures can be omitted, or sized differently, and other data structures can be added.

To illustrate, M0 is a base case or reference topology matrix with one dimension for J bus nodes, and the other dimension for I monitored branches. The second character "0" is used to distinguish the base case or reference data structure M0 from a similar topology matrix Mk indicating topology changes in contingency k. Matrix M0 can be input as predetermined configuration data.

TABLE 2

| Symbol | Size | Type | Description |
|---|---|---|---|
| A<br>A0<br>At | J × J | CC | Bus admittance matrix. Consistent with industry usage, the "admittance" components of this sparse matrix actually represent susceptance, in a DC power flow methodology. A0 is a reference admittance matrix common across all states t, while At is a base admittance matrix for a state t. |
| C0 | I × I | CC | Branch admittance matrix, sparse. |
| D0 | I × N | OO | Sensitivity matrix of power flow in branch i to power injection in transactional node t under base case topology. The "sensitivity" is the partial derivative $\partial r_i/\partial q_t$ and is dimensionless. |
| E | J × N | CC | Maps power injection at transactional node t to power flow at bus node j. |
| F | J × J | WW | Cholesky factor of A or A0, triangular. |
| M0 | J × I | CC | Sparse topology matrix indicating connection of branch i to node j. |
| Q, q | N | DD | Vector of power injections at transactional nodes, to be evaluated by SFT. q can represent a SCUC candidate solution. |
| $\bar{r}$ | I | CC | Branch power flow limits, expressed as positive numbers. |
| r0 | I | OO | Branch power flow. |
| Z | J × J | CC | Diagonal matrix to null out bus angle at reference bus node j = j0. |
| α | 1 | CC | Global constant related to bus participation factors. |

4.3 Perturbation Data Structures

In Table 3, data structures are described in the right column, a symbol for the data structure is listed in the left column, and a usual size for the data structure is listed in the second column. Data structures having "k" as second letter, such as Ck, can have K instances, one for each contingency. Data structures having "s" as second letter, such as $Xs^{br}$, can be replicated for respective values of a corresponding perturbation rank $sk^{br}$, and are often 3-D arrays. The categories CC, WW, II, or SS for Configuration, Working, Intermediate, or Output data structures are similar to Table 2. In some examples, certain of these data structures can be omitted, or sized differently, and other data structures can be added. To illustrate, Mk is a sparse matrix with one dimension for J bus nodes and another dimension for the $sk^{br}$ branches affected by contingency k, some of which could experience an outage with associated topology change. Matrix Mk can be provided as configuration data for predetermined contingency k. Data structures having "p" as second letter, such as Mp can have multiple instances for various perturbations, which can be state perturbations, contingency perturbations or both. To illustrate, with 36 states, 800 contingencies which are independent of state, and 200 contingencies which are dependent on state, Mp can include 36 instances ("Mt") for the states, 800 instances ("Mk") for the independent contingencies, and 36×200=7,200 instances ("Mtk") jointly indexed by state and contingency.

TABLE 3

| Symbol | Size | Type | Description |
|---|---|---|---|
| Bk | $J \times sk^{br}$ | WW | Right matrix factor for bus rebalancing in contingency k |
| Bp | $J \times sp^{br}$ | | or in perturbation p. |
| Ck | $sk^{br} \times sk^{br}$ | CC | Diagonal perturbation to branch admittance in |
| Cp | $sp^{br} \times sp^{br}$ | | contingency k or in perturbation p. As elsewhere, p∈{t, k, tk}. Ck, Cp are perturbation definition arrays. |
| D1 | $V \times N$ | OO | Sensitivity of branch current in branch-contingency violation v to power injection at transactional node t for violated contingencies k. |
| Gk | $J \times sk^{bu}$ | WW | Left matrix factor for bus rebalancing in contingency k |
| Gp | $J \times sp^{bu}$ | | or in perturbation p. |
| Hk | $I \times I$ | CC | Diagonal mask array for branches active in contingency |
| Hp | $I \times I$ | | k or in perturbation p. |
| Hs | $I \times s \times I$ | II | 3-D stack of Hk matrices. |
| Lk | $sk^{br} \times sk^{br}$ | WW | Triangular factor of working matrix Vk or Vp. |
| Lp | $sp^{br} \times sp^{br}$ | | |
| Mk | $J \times sk^{br}$ | CC | Sparse perturbation definition array defining topology |
| Mp | $J \times sp^{br}$ | | changes in contingency k or in perturbation p. |
| r1 | $I^{<\ >}$ | OO | Branch power flows under contingency k, e.g. (i, k) component of r1 is the power flow on branch i under contingency k or under perturbation p. |
| $rk^{br}$ | I | WW | Branch power flow for branch perturbation in |
| $rp^{br}$ | | | contingency k or in perturbation p. |
| $rk^{bu}$ | I | WW | Branch power flow for bus perturbation in contingency |
| $rp^{bu}$ | | | k or in perturbation p. |
| $rMax^{br}$ | I | WW | Maximum perturbation power flow in branch i due to branch perturbations, across all contingencies or across all perturbations. "Minimum" and "maximum" are algebraic minimum and maximum, i.e. maximum of 5 and −15 is 5; minimum of 5 and −15 is −15. Minimum and maximum can be denoted by functions min, max, which can be applied to sets of numbers. |
| $rMax^{bu}$ | I | WW | Maximum perturbation power flow in branch i due to bus perturbations, across all contingencies or across all perturbations. |
| $rMin^{br}$ | I | WW | Minimum perturbation power flow in branch i due to branch perturbations, across all contingencies or across all perturbations. |
| $rMin^{bu}$ | I | WW | Minimum perturbation power flow in branch i due to bus perturbations, across all contingencies or across all perturbations. |
| $rs^{br}$ | $I \times s$ | WW | 3-D stack of branch power flows for branch perturbation. |
| $rs^{bu}$ | $I \times s$ | WW | 3-D stack of branch power flows for bus perturbation. |
| Uk | $sk^{br} \times sk^{br}$ | WW | Triangular factor of working matrix Vk, Vp. |
| Up | $sp^{br} \times sp^{br}$ | | |
| Vk | $sk^{br} \times sk^{br}$ | WW | Working matrix. |
| Vp | $sp^{br} \times sp^{br}$ | | |
| Wk | $J \times sk^{br}$ | WW | Working matrix. |
| Wp | $J \times sp^{br}$ | | |
| $Xp^{br}$ | $I \times sp^{br}$ | II | Left power flow perturbation factor array for branch |
| $Xt^{br}$ | $I \times st^{br}$ | | perturbation power flow in perturbation p, in state t, in |
| $Xk^{br}$ | $I \times sk^{br}$ | | contingency k, or in joint perturbation tk, also "left |
| $Xtk^{br}$ | $I \times stk^{br}$ | | branch perturbation matrix" or "left branch perturbation array". |
| $Xp^{bu}$ | $I \times sp^{bu}$ | II | Left power flow perturbation factor array for bus |
| $Xt^{bu}$ | $I \times st^{bu}$ | | perturbation power flow in perturbation p, in state t, in |
| $Xk^{bu}$ | $I \times sk^{bu}$ | | contingency k, or in joint perturbation tk, also "left bus |
| $Xtk^{bu}$ | $I \times stk^{bu}$ | | perturbation matrix" or "left bus perturbation array". |
| $Xs^{br}$ | $I \times s \times sk^{br}$ | II | 3-D stack of left factors for branch perturbation power flow. |
| $Xs^{bu}$ | $I \times s \times sk^{bu}$ | II | 3-D stack of left factors for bus perturbation power flow. |
| $Yk^{br}$ | $N \times sk^{br}$ | II | Right power flow perturbation factor array for branch |
| $Yp^{br}$ | $N \times sp^{br}$ | | perturbation power flow in perturbation p, in state t, in contingency k, or in joint perturbation tk, also "right branch perturbation matrix" or "right branch perturbation array". |
| $Yk^{bu}$ | $N \times sk^{bu}$ | II | Right power flow perturbation factor array for bus |
| $Yp^{bu}$ | $N \times sp^{bu}$ | | perturbation power flow in perturbation p, in state t, in contingency k, or in perturbation p, also "right bus perturbation matrix" or "right bus perturbation array". |
| $Ys^{br}$ | $N \times s \times sk^{br}$ | II | 3-D stack of right factors for branch perturbation power flow. |
| $Ys^{bu}$ | $N \times s \times sk^{bu}$ | II | 3-D stack of right factors for bus perturbation power flow. |
| βp | 1 | CC | Bus injection change factor for perturbation p, in state t, |
| βt | | | contingency k, or joint perturbation tk, can be expressed |
| βk | | | as a diagonal matrix. This factor contributes to the |

TABLE 3-continued

| Symbol | Size | Type | Description |
| --- | --- | --- | --- |
| $\beta tk$ | | | importance ("participation factor") for the various buses associated with perturbation p, t, k, or tk. |
| $\sigma p$ $\sigma t$ $\sigma k$ $\sigma tk$ | 1 | WW | Normalization constant for perturbation p, in state t, contingency k, or joint perturbation tk, can be expressed as diagonal matrix. |

III. Example Power Grid

FIG. 1 is a diagram of an example electrical power grid 100, represented as a graph of vertices (which can represent bus nodes and transactional nodes, described further below) and edges (which can represent power lines).

1. Power Grid Terminology

Edges of the graph represent power lines, which can include high voltage transmission lines (often, about 69 kV to about 1 MV) and medium voltage distribution lines (often, about 12 kV to 44 kV). In accord with industry practice, the edges of the graph are termed "branches." Different branches can operate in disparate modes, such as alternating current ("AC") or direct current ("DC") or at different voltages, with suitable transforming equipment at the nodes where disparate branches join. A physical power grid can include branches that can be omitted from evaluation of constraints, leaving "monitored branches" as those represented in various data structures or equations described herein. The amount of power flowing, e.g. measured in megawatts (MW), in a branch is dubbed "power flow."

Nodes of the graph such as 114 represent junctions between power lines or terminations of power lines, and can include equipment (such as transformers or switchgear at a substation) or external interfaces (for power plants or other generators; for factories or other loads; for interconnect to other grids including municipal utilities; or for other grid participants). In accord with industry practice, the nodes of the graph are termed "buses," and can be of two types: "transactional nodes" and "infrastructure nodes." A transactional node is a node at which power can be provided to the grid or delivered from the grid in a transaction between the grid operator and an external party, or between two external parties. A transactional node is sometimes called a "pricing node" or "p-node" in industry practice. The term "injection" refers to an amount of power supplied to the power grid (positive value of injection) or supplied from the grid (negative value of injection) at a given node. In some examples, power injection at transactional nodes is of particular interest. An infrastructure node is a node, commonly part of a grid infrastructure, at which power transactions do not occur. However, an infrastructure node can also have power losses, despite having no power transfers with external parties.

As the grid state evolves between time periods, a variety of topology changes can be represented as perturbations. These topology changes include splitting a bus into two or more buses ("split bus", e.g. by opening one or more switches), merging two or more buses into a single bus ("merged bus", e.g. by closing one or more switches), or creation of an island ("new island", e.g. by opening one or more switches to isolate a portion of the grid).

2. Computation Formulation

Different power grid computation models are used in industry. The present disclosure is directed to a "DC power flow" model, in which power flow (MW) in a branch joining two nodes is proportional to a product of (i) the phase angle difference between AC voltage waveforms on the two nodes, and (ii) the susceptance of the branch. Consistent with industry practice, the term "admittance" is used herein for the branch susceptance. Some of the innovations described herein are particularly applicable to the DC power flow model, others are more generally applicable but particularly advantageous for the DC power flow model, while further innovations are independent of the computation model used.

3. The Illustrated Grid

Illustrated grid 100 is greatly simplified. A real-world power grid can have 1,000 to 50,000 nodes. Of these, about 10 to 3,000 can be transactional nodes, commonly about 1,000 to 2,000 transactional nodes, with a mix between generators and loads. With growth of distributed and renewable generation capacity, the proportion of generators has been increasing over time. The number of branches can be comparable to the number of nodes.

In grid 100, transactional nodes 121-124 and 131-135 are shown in bold outline, while infrastructure nodes 111-118 are shown with lighter weight outlines. Starting at the top left of FIG. 1, node 111 can represent a substation through which loads 131-133 are served. To illustrate, loads 131-133 can be industrial plants. Branches 151-154 can form a main transmission corridor joining infrastructure nodes 111-115. Transactional nodes 121, 122 can represent power plants, connected by respective branches to nodes 111, 112 as shown. Also connected to node 112 is transactional node 134, which can be an interconnection point for a municipal utility 161, serving a mix of residential and commercial customers 141-144. Municipal utility 161 can handle its own clients and their transactions. Hence, other than interface 134, the nodes 141-144 of municipal utility 161 can be excluded from grid 100, in the context of the disclosed technology, and accordingly are shown with dashed outline. Node 114 can be an interconnect with a side corridor serving a remote power plant 123 via intermediate node 116. Power plant 124 can have redundant interconnect to the main corridor 111-115, tying to node 114 via intermediate node 117, and tying to node 115 via intermediate node 118.

Transactional node 135 can be similar to node 134, inasmuch as it serves nodes 145-147 that are coupled to but not part of grid 100, however node 135 can have two tie points to the rest of grid 100. To illustrate, nodes 146 and 147 can be distribution substations respectively receiving power from nodes 114 and 115 of the main corridor, and in turn serving a load at node 145. Further, node 135 is an example of a transactional node that is an aggregate of bus nodes 145-147, but is not a bus node itself.

The terms generator and loads are used as a matter of convenience. That is, a "generator" 121-124 normally delivers power to grid 100 and a "load" 131-135 normally receives power from grid 100. However, these are not requirements. In some circumstances, a node labeled as a generator can receive net power from the grid, for example when a power plant is down for maintenance and requires a small amount of power for auxiliary functions, or when a generator has rechargeable storage capacity and elects to recharge from the grid 100 rather than by generating its own power. Similarly, in some circumstances a node labeled as a load can provide power to the grid 100. For example, if nodes 141-144 are residences having their own renewable (e.g. solar) generating capacity or storage capacity, when their own electricity demand is low, transactional node 134 can provide net power to the grid 100.

IV. First Example SFT Method

Figure 2:
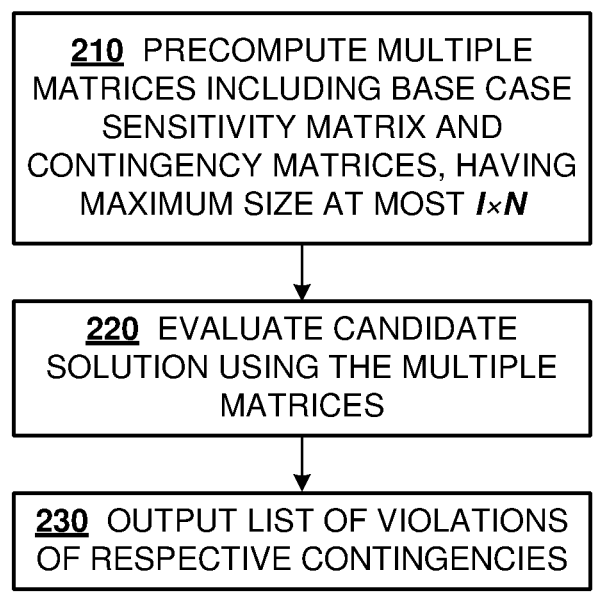
FIG. 2 is a flowchart of a first example SFT method according to the disclosed technologies.

FIG. 2 is a flowchart 200 of a first example SFT method. In this method, a precompute phase precedes evaluation of a candidate solution. A candidate solution to a SCUC problem can be provided along with a call from a SCUC solver. After SFT evaluation, results can be returned to the SCUC solver. The method can be performed by an SFT solver.

At process block 210, multiple matrices can be precomputed. A power grid graph can include I* branches, of which I are monitored for evaluation of constraints or contingencies. The power grid graph can include N transactional nodes. Then, the precomputed matrices can have maximum size of at most I×N. In examples, where precomputed data structures include arrays of three or more dimensions, any two-dimensional cross-section can have size at most I×N. As further described herein, the use of an I×N matrix instead of, say, an I×J matrix as in conventional technologies, directly translates to less data storage and less compute operations, for a significant increase in computing efficiency. Block 210 can use as input assorted data provided or retrieved from a configuration data store. The input data can include information about the power grid (e.g. topology of the power grid, and electrical properties of various grid components) and contingencies of interest (e.g. which bus node or branch components are involved in a given contingency). Exemplary input data are described further herein.

At process block 220, a candidate solution can be evaluated using the matrices precomputed at block 210. The candidate solution can be obtained via a call from an SCUC solver. In addition to the precomputed matrices, the evaluation at block 220 can also make use of constraints obtained from the data store. In some examples, constraints can be read in along with other input data, and retained for subsequent use at block 220. In varying examples, the evaluation at block 220 can determine a list of violations for respective branches under each contingency. Optionally, the evaluation can generate sensitivities of each violation to power injections at some respective transactional nodes. In varying examples, sensitivities can be evaluated for violated branches under each violated contingency, a predetermined set of contingencies, all contingencies, a predetermined set of branches, or all monitored branches, in any combination.

Then, at process block 230, a list of the violations determined at block 220 can be output for respective contingencies or branches. Additionally or alternatively, sensitivities of each violation to power injections at some respective transactional nodes can be output. The outputs can be returned to the SCUC solver.

Numerous variations and extensions of the first method can be implemented within the scope of the disclosed technologies, including several described herein. In some examples, the candidate solution can be a vector of power injections at up to N transactional nodes. Process block 210 can include computations with matrices of size I×J or J×J, such that all computation with matrices of these sizes are included within precompute block 210. Absence of matrices of size I×I or I×J from process block 220 can speed up the average time for SFT evaluation significantly. For example, input data can include a bus admittance matrix of size J×J, which can be factored using Cholesky decomposition within block 210. The matrices calculated at block 210 can include left and right perturbation matrices for the branch perturbations associated with each contingency, and can include left and right perturbation matrices for the bus perturbations associated with each contingency. The various contingencies can have respective ranks $sk^{br}$ for branch perturbations and respective ranks $sk^{bu}$ for bus perturbations. To illustrate, a given contingency can have $sk^{br}=3$ and $sk^{bu}=2$. Then, all left branch perturbation matrices of rank $sk^{br}=3$ can be aggregated into a 3-D array, and similarly for right branch perturbation matrices. Likewise, all left bus perturbation matrices of rank $sk^{bu}=2$ can be aggregated into a 3-D array, and similarly for right bus perturbation matrices, resulting in typically a few dozen consolidated 3-D arrays for the various ranks $sk^{br}$, $sk^{bu}$.

Use of 3-D arrays can further speed up computation at block 220, as compared to computing each contingency separately. That is, at block 220, contingency power flow terms can be computed for the various contingencies using the 3-D arrays. These contingency power flow terms can also be obtained as 3-D arrays, and can be evaluated without expensive matrix permutations to determine which branches are free of any constraint violation in any contingency. A complement of these violation-free branches can be retained or extracted as a subset of all branches, for further analysis. Then, the branches in the subset can be individually evaluated to determine which, if any, constraints are violated, leading to a list of branch-contingency violation pairs. Each such pair includes an identifier of a branch and an identifier of a corresponding constraint that is violated. Additionally, each pair can be part of a larger structure, such as a triple, 4-tuple, etc., the additional fields denoting quantities such as branch power flow, an extent of violation (e.g. 130% of rated capacity), or another parameter related to the branch, the contingency, or the violated constraint.

V. First Example Dataflow Diagram

Figure 3A:
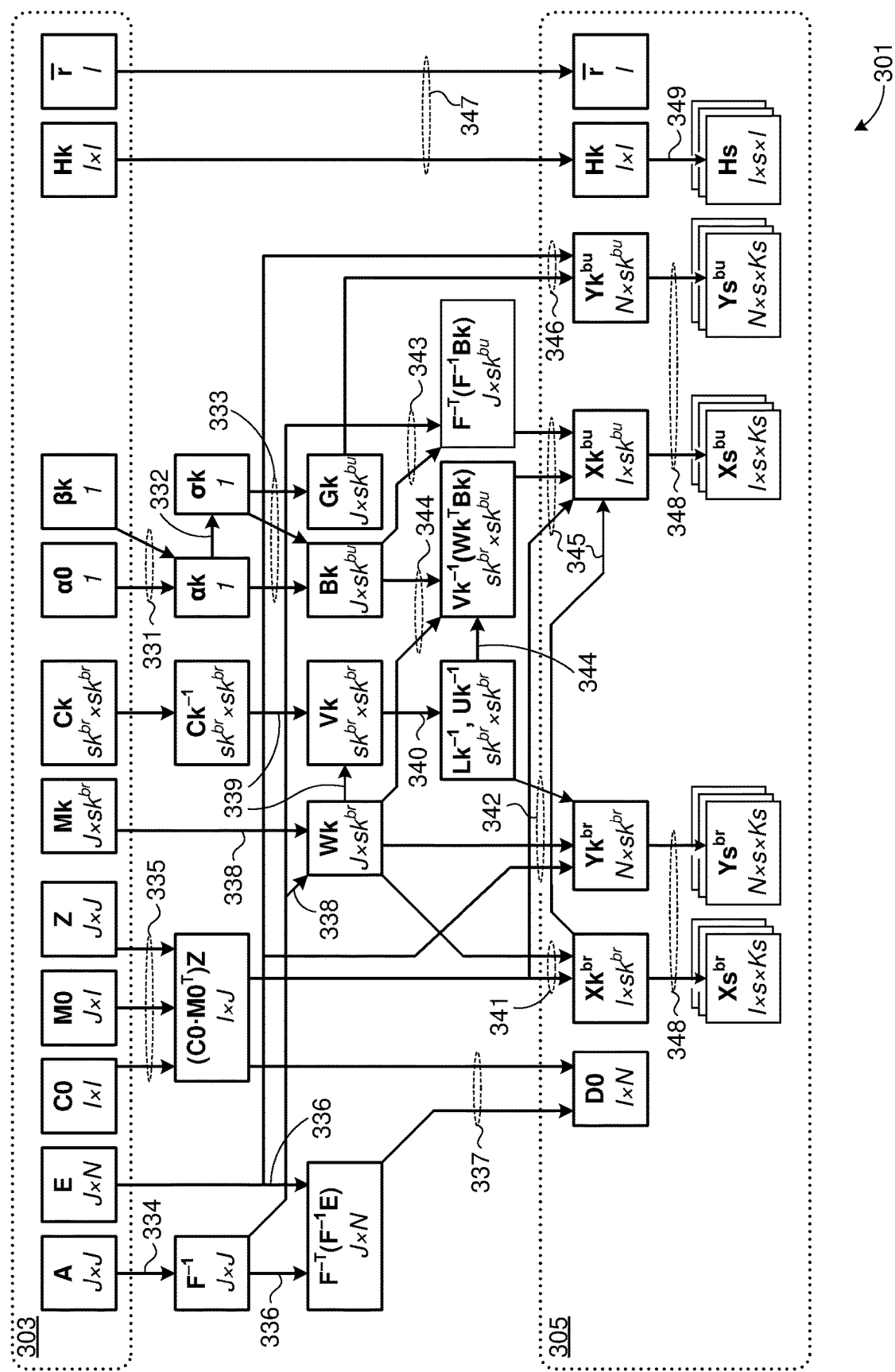
FIGS. 3A-3B are parts of a first example dataflow diagram according to the disclosed technologies.
Figure 3B:
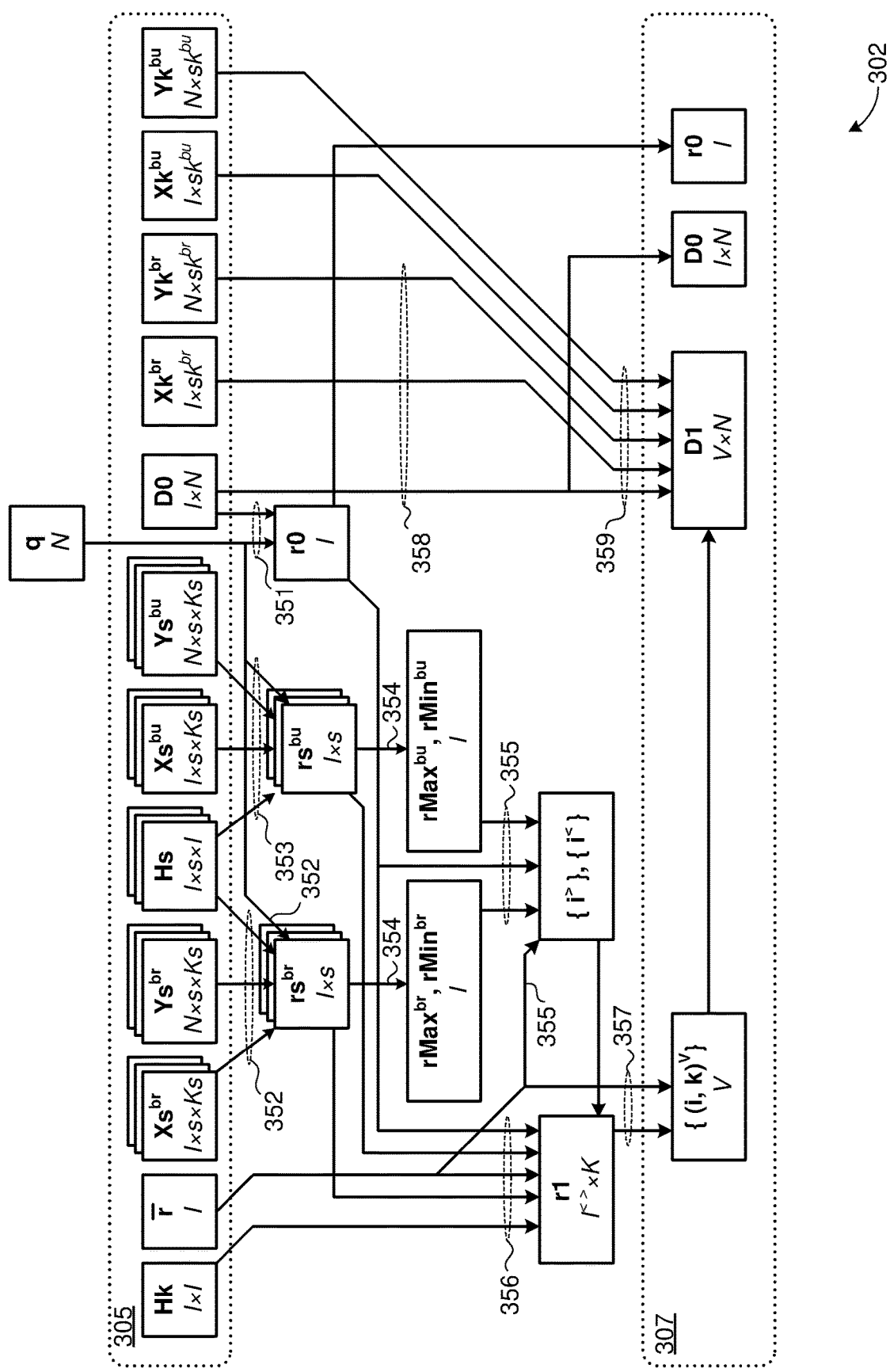

FIGS. 3A-3B are parts 301, 302 of an example dataflow diagram according to the disclosed technologies. Details of an exemplary SFT implementation are described in the context of FIGS. 3A-3B, together with examples of pseudocode in the tables below. The details described can be included, individually or severally, in other examples of the disclosed technology. FIGS. 3A-3B are illustrative, and many variations can be made to the data items, their organization, or the organization of the related operations, within the scope of the disclosed technologies.

1. Notation

The notation of FIGS. 3A-3B generally matches that used elsewhere in this disclosure. Each data item is shown in a box, with the name of the data item on the first line, and its size on the second line. For example, branch admittance matrix C0 is listed as having a size I×I. Most depicted data items are matrices, a few are vectors (e.g. $\bar{r}$) or scalars (e.g. $\alpha 0$), a few are lists (e.g. $\{\bar{i}\}$), and a few are 3-D arrays (e.g. $Xs^{br}$, illustrated as a stack of boxes). Where the same symbol is used for both base case and perturbation analysis of contingencies, a "0" is appended to the base case data item and "1" or "k" is appended to the perturbation data item. Thus, D0 and D1 for sensitivities, and C0 and Ck for bus admittance matrices. The "k" indicates that there are multiple such data items, commonly one for each contingency k, and K in total, even though only a single data item (e.g. $Xk^{br}$) is shown in FIGS. 3A-3B. Thus, any of the matrices denoted with "k" in the symbol (such as Ck, Mk, Xk, Yk) can be dubbed a "contingency matrix." Similarly, an appended "s" indicates that there are multiple such data items (e.g. $Xs^{br}$), commonly one for each rank $sk^{br}$ or $sk^{bu}$. Superscripts br, bu denote that the quantity pertains to branch perturbations or bus perturbations respectively, and are sometimes omitted where the description pertains generically to either type of perturbation.

2. Overview

Table 4 illustrates an overview of an example SFT procedure.

TABLE 4

| | SFT procedure |
|---|---|
| L200 | Read configuration data from files. |
| L201 | Perform precomputation. |
| L202 | Begin loop |
| L203 | Receive vector q of injections at transactional nodes |
| L204 | Perform evaluation of q for base case, constraints, and contingencies. |
| L205 | Output violations $\{i^V\}$, $\{(i, k)^V\}$; branch flows r, r1; sensitivities D, D1. |
| L206 | End loop |

At operation L200, configuration data pertaining to a power grid can be read from files. The configuration data can include some or all of the items 303 indicated in FIG. 3A and detailed at Section (II)(4.2-4.3) herein. At operation L201, precomputation can be performed similar to the illustration of FIG. 3A, or process block 210, and described further below. Operations L202-L206 form a loop, as the SFT solver can be called repeatedly for different inputs (e.g. candidate solutions of a SCUC problem). At operation L203, a vector q of injections at transactional nodes can be input to the SFT solver, and at operation L204, the vector q can be evaluated with respect to predefined constraints and contingencies. Operation L204 can be similar to the illustration of FIG. 3B, process block 220, or as described further below. At operation L205, evaluation results can be output. Example outputs can include one or more of: a list of branches having violations; a list of branch-contingency pairs with violations; branch flows r0 (base case), r1 (contingencies); sensitivities D0 (base case), D1 (contingencies).

3. Precomputation

Table 5 illustrates an example of precomputation, similar to operation L202.

TABLE 5

| | Precomputation |
|---|---|
| L300 | Compute $\alpha k$, $\sigma k$ |
| L301 | Construct Bk, Gk |
| L302 | Compute Cholesky factors F, $F^T$ of bus admittance matrix A |
| L303 | Compute $(C0 \cdot M0^T)Z$ |

TABLE 5-continued

| | Precomputation |
|---|---|
| L304 | Compute $F^{-T}(F^{-1} \cdot E)$ |
| L305 | Compute base case sensitivity matrix D0 |
| L306 | Compute working matrix Wk |
| L307 | Compute working matrix Vk |
| L308 | Compute triangular factors Lk, Uk of Vk by L-U factorization |
| L309 | Compute left branch perturbation matrix $Xk^{br}$ |
| L310 | Compute right branch perturbation matrix $Yk^{br}$ |
| L311 | Compute working matrix $F^{-T}(F^{-1} \cdot Bk)$ |
| L312 | Compute working matrix $Vk^{-1}(Wk^T \cdot Bk)$ = $Uk^{-1} \cdot (Lk^{-1} \cdot (WK^T \cdot Bk))$ |
| L313 | Compute left bus perturbation matrix $Xk^{bu}$ |
| L314 | Compute right bus perturbation matrix $Yk^{bu}$ |

At operation L300, a bus participation factor can be adjusted for bus change factors for each contingency, according to Equation E3.1, and normalizing constants can be computed for each contingency, according to Equation E3.2. Arrows 331, 332 in FIG. 3A represent similar operations.

$$\alpha_k = (1+\beta_k)\alpha \tag{E3.1}$$

$$\sigma_k = 1^T \alpha_k \tag{E3.2}$$

At operation L301, left and right matrix factors for bus rebalancing can be extracted from the diagonal left-hand side of Equation E3.3. Arrows 333 in FIG. 3A represent similar operations.

$$\beta_k - 1/\sigma_k(1+\beta_k)\alpha 1^T \beta_k = B_k G_k^T \tag{E3.3}$$

At operation L302, a triangular factor F of bus admittance matrix can be computed by Cholesky decomposition, and inverted. Arrow 334 in FIG. 3A represents similar operations.

At operation L303, intermediate matrix $(C0 \cdot M0^T)Z$ can be computed in the order indicated by the parentheses, similar to arrows 335 of FIG. 3A.

At operation L304, intermediate matrix $F^{-T}(F^{-1} \cdot E)$ can be computed in the order indicated by the parentheses, similar to arrows 336 of FIG. 3A. Superscript "-T" (e.g. $F^{-T}$) denotes the transpose of the inverse of the corresponding matrix (namely F). In some examples, $F^{-1} \cdot E$ can be computed by solving $F \cdot \Gamma = E$ to obtain $F^{-1} \cdot E = F$, and similarly for the multiplication by $F^{-T}$.

At operation L305, base case sensitivity D0 can be computed following Equation E3.4, similar to arrows 337 of FIG. 3A. In Equation E3.4, and elsewhere in this section, square brackets denote expressions that have previously been computed, e.g. at operations L303, L304.

$$D0 = [(C0 \cdot M0^T)Z] \cdot [F^{-T}(F^{-1} \cdot E)] \tag{E3.4}$$

At operations L306, L307, working matrices Wk, Vk can be computed according to Equations E3.5, E3.6, and at operation L308 LU decomposition can be applied to Vk as indicated by Equation E3.7, and the factors Lk, Uk can be inverted. Similar operations are depicted by arrows 338-340 in FIG. 3A.

$$Wk = F^{-T} \cdot (F^{-1} \cdot Mk) \tag{E3.5}$$

$$Vk = (Ck)^{-1} + (Mk^T \cdot Wk) \tag{E3.6}$$

$$Vk = Lk \cdot Uk \tag{E3.7}$$

At operations L309, L310, left and right matrix factors for branch flows due to contingency branch perturbations can be computed according to Equations E3.8, E3.9. Similar operations are depicted by arrows 341-342 in FIG. 3A.

$$Xk^{br}=[(C0 \cdot M0^T) \cdot Z] \cdot Wk \quad (E3.8)$$

$$Yk^{br}=((E^T \cdot Wk) \cdot Lk^{-T}) \cdot Uk^{-T} \quad (E3.9)$$

At operations L311, L312 working matrices $F^{-T}(F^{-1} \cdot Bk)$ and $Uk^{-1} \cdot (Lk^{-1} \cdot (Wk^T \cdot Bk))$ can be computed in the order indicated by the parentheses. Arrows 343-344 in FIG. 3A denote similar operations.

At operation L313, L314, left and right matrix factors for branch flows due to contingency bus perturbations can be computed according to Equations E3.10, E3.11. Similar operations are depicted arrows 345-346 in FIG. 3A.

$$Xk^{bu}=Xk^{br} \cdot [Uk^{-1}(Lk^{-1}(Wk^T \cdot Bk))]-[(C0 \cdot M0^T)Z] \cdot [F^{-T}(F^{-1} \cdot Bk)] \quad (E3.10)$$

$$Yk^{bu}=E^T \cdot Gk \quad (E3.11)$$

In some examples, mask matrix H and branch constraints $\bar{r}$ can also be read in at operation L200, but may not be used within the precomputation of operation L201. These and similar quantities can be passed on with precomputed intermediate matrices 305 as indicated by arrows 347.

In further examples, the X, Y matrix factors for perturbation branch flows can be stacked according to rank as indicated by arrows 348. To illustrate, consider an example with contingencies k=1-4 having respective branch ranks $sk^{br}$=4, 5, 4, 5 and respective bus ranks $sk^{bu}$=2, 3, 3, 2. Then for k=1, 3 the $Xk^{br}$ matrices have size I×4 and can be stacked to form a 3-D array $Xs^{br}$ of size I×4×2. Similarly, for k=2, 4 the $Xk^{br}$ matrices can be stacked to obtain a 3-D array $Xs^{br}$ of size I×3×2. Stacking for the $Yk^{br}$ matrices is similar and produces $Ys^{br}$ matrices of size N×4×2 (for k=1, 3) and N×3×2 (for k=2, 4). Stacking for bus perturbations can be similar. For k=2, 3, the $Xk^{bu}$, $Yk^{bu}$ matrices can be stacked to obtain $Xs^{bu}$, $Ys^{bu}$ arrays of size I×3×2 and N×3×2 respectively, and similarly for k=1, 4. Because the branch and bus ranks are generally independent, the contingencies grouped together in $Xs^{br}$, $Xs^{bu}$ can differ. In the illustration, contingency k=2 is grouped with k=4 for branch perturbations, but k=2 is grouped with k=3 for bus perturbation. In additional examples, contingency mask matrix Hk can also be stacked into one or more 3-D arrays Hs, as shown by arrow 349.

Some or all of the data items 305 shown in FIG. 3A can be outputted (e.g. returned to a calling program, saved in memory or in storage, or transmitted to another computer) for use in evaluating candidate solutions, e.g. in the form of vectors of power injections.

4. Candidate Evaluation

Table 6 illustrates an example of operation L204, and is described below with reference to FIG. 3B. Dotted outline 305 indicates quantities which can be received from the precompute stage L201 (or, in some cases, from input stage L200).

TABLE 6

Evaluation of input vector of power flow injections

| | |
|---|---|
| L400 | Obtain q |
| L401 | Compute base case branch currents r0 |
| L402 | Compute contingency branch currents $rk^{br}$ due to branch perturbations |
| L403 | Compute contingency branch currents $rk^{bu}$ due to bus perturbations |
| L404 | Compute $\{i^>\}$, $\{i^<\}$ |
| L405 | Compute r1 |
| L406 | if all violated contingencies are to be reported for each branch, then |
| L407 | Compute $\{(i, k)^r\}$ |
| L408 | else, if only the maximally violated contingency needed for each branch, |
| L409 | Compute $\{(i, k)^r\}$ |
| L410 | end if |
| L411 | if using simplified sensitivity factors (without bus perturbations) then |
| L412 | Compute D1 |
| L413 | else (with bus perturbations) |
| L414 | Compute D1 |
| L415 | end if |

At operation L400, an input vector q can be received, which can be a vector of power injections over a set of N transactional nodes. At operation L401, base case branch currents can be computed according to Equation E4.1, similarly to the operation indicated by arrow 351 of FIG. 3B.

$$r0=D0 \cdot q \quad (E4.1)$$

At operations L402, L403 contingency branch currents $rk^{br}$, $rk^{bu}$ due to branch perturbations and bus perturbations, respectively, can be computed according to Equations E4.2, E4.3. In other examples, 3-D equivalents $rs^{br}$, $rs^{bu}$ can be computed using Equations E4.4, E4.5, similar to the operations indicated by arrows 352, 353 of FIG. 3B.

$$rk^{br}=Hk \cdot (Xk^{br} \cdot ((Yk^{br})^T \cdot q)) \quad (E4.2)$$

$$rk^{bu}=Hk \cdot (Xk^{bu} \cdot ((Yk^{bu})^T \cdot q)) \quad (E4.3)$$

$$rs^{br}=Hs \cdot (Xs^{br} \cdot ((Ys^{br})^T \cdot q)) \quad (E4.4)$$

$$rs^{bu}=Hs \cdot (Xs^{bu} \cdot ((Ys^{bu})^T \cdot q)) \quad (E4.5)$$

At operation L404, a determination can be made of which branches potentially have power flows outside the range [−$\bar{r}$, $\bar{r}$], using Equations E4.6-E4.11. In alternative examples, 3-D arrays $rs^{br}$, $rs^{bu}$ can be used in place of $rk^{br}$, $rk^{br}$ in Equations E4.6-E4.9, as indicated by arrows 354. Operations similar to Equations E4.10-E4.11 are indicated by arrows 355 in FIG. 3B.

$$r\text{Max}^{br}=\max(rk^{br}) \text{ over } k \quad (E4.6)$$

$$r\text{Min}^{br}=\min(rk^{br}) \text{ over } k \quad (E4.7)$$

$$r\text{Max}^{bu}=\max(rk^{bu}) \text{ over } k \quad (E4.8)$$

$$r\text{Min}^{bu}=\min(rk^{bu}) \text{ over } k \quad (E4.9)$$

$$\{i^>\}=\{i:(r0+r\text{Max}^{br}+r\text{Max}^{bu})_i > \bar{r}_i\} \quad (E4.10)$$

$$\{i^<\}=\{i:(r0+r\text{Min}^{br}+r\text{Min}^{bu})_i < -\bar{r}_i\} \quad (E4.11)$$

The remaining branches, satisfying Equation E4.12 can be discarded or ignored in subsequent evaluation. The union of $\{i^>\}$, $\{i^<\}$ is a subset of the I monitored branches, with cardinality $I^{<>}$. Then, at operation L405, the branch contingency power flows (including base case current r0 and the perturbation power flows rk or rs, can be computed by Equation E4.12 for each of these branches, corresponding to arrows 356 in FIG. 3B.

$$r1=Hk \cdot (r0+rk^{br}+rk^{bu}) \quad (E4.12)$$

A list of V violations can be computed at operations L406-L410. At L407, the list of violations can be computed according to Equation 4.13 to obtain all branch-contingency pairs violating their respective branch constraint. At L409, only the largest violated contingency for each branch can be retained, e.g. according to Equation E4.14. Equation E4.14 collects contingencies k having maximum value of $(|(r1)_{i,k}|-\bar{r}_i)$ for each i, subject to there being a violation $(|(r1)_{i,k}|-\bar{r}_i)>0$. Arrows 357 in FIG. 3B represent an operation similar to either operation L407 or L409.

$$\{(i,k)^V\}=\{i,k:|(r1)_{i,k}|>\bar{r}_i\} \quad (E4.13)$$

$$\{(i,k)^V_-\}=\{i,k:\max(|(r1)_{i,k}|-\bar{r}_i) \text{ over } k, \text{ and } (|(r1)_{i,k}|-\bar{r}_i)>0\} \quad (E4.14)$$

In some examples, the reported violations can be extended to triples by incorporating either $(r1)_{i,k}$ or another measure of the extent of the violation such as $\Delta=(|(r1)_{i,k}|/\bar{r}_i)-1$; thus a triple (i, k, r1) or (i, k, $\Delta$), or a 4-tuple (i, k, r1, $\Delta$) can be formed for each of the V violations.

Sensitivities D1 can be computed at operations L411-L415. In some examples, sensitivities can be computed retaining only branch perturbations, at operation L412, according to Equation 4.15, with similar operations indicated by arrows 358. In other examples, both branch and bus perturbations can be included, at operation L414, according to Equation 4.16, with similar operations indicated by arrows 359 in FIG. 3B.

$$D1=D0+(Xk^{br}\cdot(Yk^{br})^T) \quad (E4.15)$$

$$D1=D0+(Xk^{br}\cdot(Yk^{br})^T)+(Xk^{bu}\cdot(Yk^{bu})^T) \quad (E4.16)$$

In some examples, an SFT solver can support both clauses of the "if" conditions at L406, L411, with the if/else selection being made at run time or on the basis of configuration parameters. In other examples, only one clause (e.g. only L407 or only L409) can be supported.

Exemplary output quantities 307 can include violation tuples and sensitivities for violated contingencies. In some examples, data structures D0 and r0 can be included in output 307 as shown.

VI. Successive Perturbation Example

In the context of FIGS. 2-3, the previous sections describe a combination of perturbation and other computation techniques to accelerate SFT for one state of an electrical power grid, subject to multiple contingencies. To perform SFT over T states of the grid, such an approach can be performed T times. However, in an alternative approach, the T states can themselves be considered as perturbations of a reference configuration of the grid. This approach leads to further computational benefits and is described further herein with reference to FIGS. 10-12.

Figure 10:
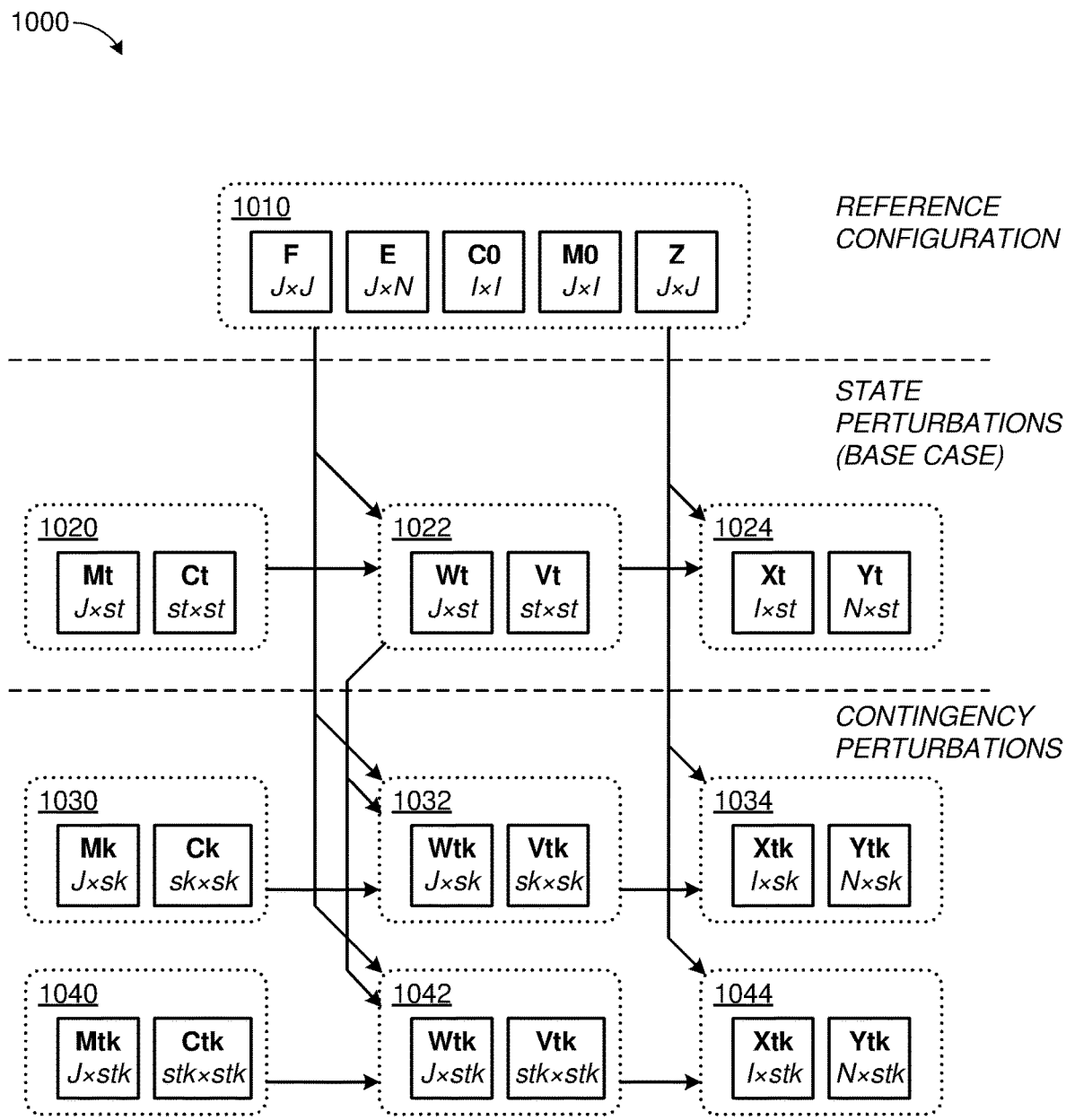
FIG. 10 is a diagram illustrating successive perturbations applied for SFT precomputation according to the disclosed technologies.

FIG. 10 is a diagram 1000 illustrating successive perturbations applied for SFT precomputation. As illustrated, state and contingency perturbations are successively applied to a reference configuration of an electrical power grid. Various arrays of interest are depicted in square boxes. Array names are shown in boldface, and sizes of their slices are indicated in italics. The notation of FIG. 10 generally matches that used elsewhere in this disclosure. The associated calculations are described further in the context of FIG. 12A.

Initially, the topology and admittances of a reference configuration of the electrical power grid are defined. In examples, matrices F, E, C0, M0, or Z can be used, as described in Table 2 and shown in dotted outline 1010. However, this is not a requirement and other data representations can be used.

Then, perturbation definition arrays Mt, Ct 1020 can be used to analyze perturbations of the grid for respective states of the grid. Intermediate arrays Wt, Vt 1022 can be calculated based on perturbation definition arrays 1020 and on one or more reference arrays 1010. In turn, power flow perturbation factor arrays 1024 can be calculated, based on intermediate arrays 1022 and one or more reference arrays 1010. In some examples, perturbation factor arrays 1024 can be Xt, Yt as described herein, however this is not a requirement and other data representations can be used. Particularly, perturbation factor arrays 1024 can be used at run time to calculate perturbation power flows rt for respective states in a base case (no contingencies) for candidate solutions.

Subsequently, contingency perturbations can be applied, taking the state perturbations into account. One or both of perturbation definition arrays Mk, Mtk can define topology perturbations for the various contingencies. Similarly, one or both of perturbation definition arrays Ck, Ctk can define admittance perturbations for the various contingencies.

Some contingencies involve branches that have no overlap with the branches involved in the state perturbations. To illustrate, if state perturbations affect only branches {b1, b2, b3}, then a contingency involving branches {b2, b4} has overlap, while another contingency involving only branches {b4, b5} is non-overlapping. The non-overlapping contingencies can be defined using perturbation definition arrays Mk, Ck 1030 which are indexed by contingency and are independent of state. Nonetheless, the response of the grid to such perturbations can be state-dependent. As illustrated in FIG. 10 and described further herein, intermediate arrays Wtk, Vtk 1032 and power flow perturbation factor arrays 1034 can be doubly indexed by both state and contingency. Intermediate arrays Wt, Vt 1022 can be used in the calculation of intermediate arrays Wtk, Vtk 1032 to take into account the state perturbations. In some examples, Xtk, Ytk can be used as the power flow perturbation factor arrays but this is not a requirement and, in other examples, components of Xtk, Ytk or other data representations can be used.

Other contingencies involve branches that overlap the branches involved in the state perturbations. These contingencies can be defined using perturbation definition arrays Mtk, Ctk 1040 which are indexed by both contingency and state. As expected, the response of the grid to such perturbations can be state-dependent. Intermediate arrays Wtk, Vtk 1042 and power flow perturbation factor arrays 1044 can be doubly indexed by both state and contingency as shown. Intermediate arrays Wt, Vt 1022 can be used in the calculation of intermediate arrays Wtk, Vtk 1042 to take into account the state perturbations. Particularly, perturbation factor arrays 1034, 1044 can be used at run time to calculate perturbation power flows rt for respective contingencies and respective states for candidate solutions.

As shown, state perturbations are applied first, and contingency perturbations applied next with incorporation of the state perturbations. However, this is not a requirement and, in other examples, contingency perturbations could be applied first (to obtain intermediate arrays Wk, Vk at 1022 and power flow perturbation factor arrays Xk, Yk at 1024) and state perturbations applied next, incorporating the contingency perturbations.

VII. Second Example SFT Method

Figure 11:
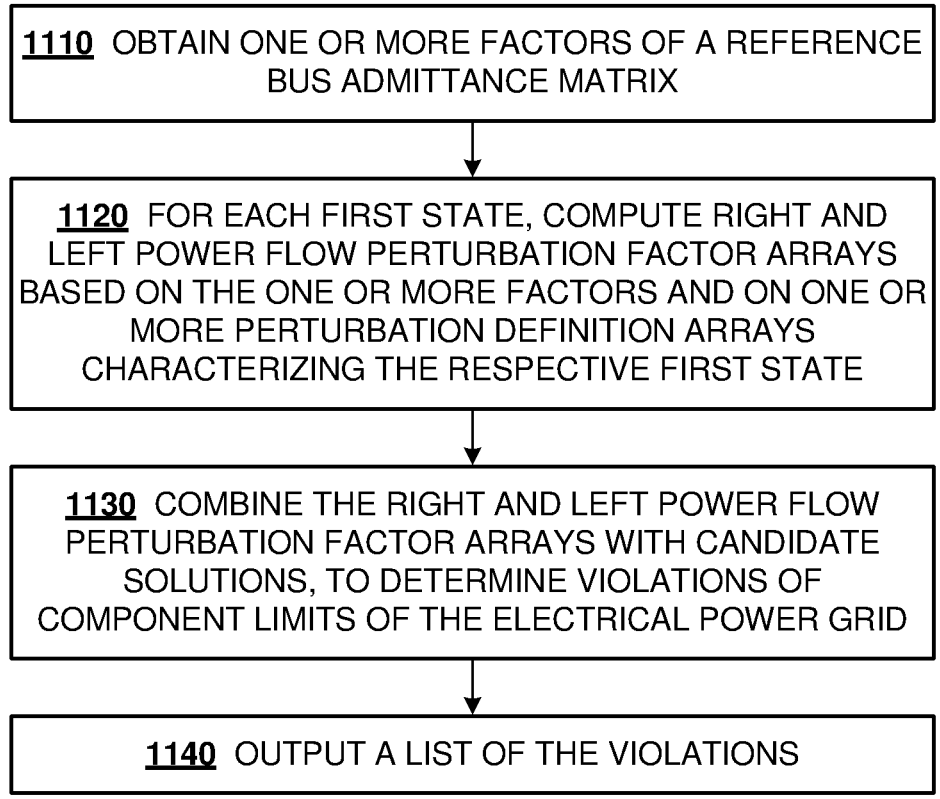
FIG. 11 is a flowchart of a second example SFT method according to the disclosed technologies.

FIG. 11 is a flowchart 1100 of a second example SFT method. Like the first example method of FIG. 2, the second method includes a precompute phase preceding testing of candidate solutions. The second method is suitable for accelerated testing of candidate solutions for multiple time intervals (or for another set of T states) of an electrical power grid.

At process block 1110, one or more factors of a reference bus admittance matrix A0 can be obtained. Given that bus admittance matrix A0 can have size J×J, where the number of buses J can often be upward of 10,000 and, presently, as high as 50,000, factorization of bus admittance matrix A0 can be the single most burdensome computation in the SFT process flow. Whereas in the first method such an inversion (as at operation L302) could be performed T times for T states of the electrical power grid, in the second method the factorization of the full bus admittance matrix can be performed at most once, realizing a significant computational saving. In some examples, process block 1110 can be performed using Cholesky factorization. As a triangular matrix, a Cholesky factor F can be efficiently inverted to obtain $F^{-1}$ and $F^{-T}$, each of which is a factor of $A0^{-1}$. However, while Cholesky factorization can be computationally efficient in some examples, other factorization or inversion techniques can also be used. Moreover, the perturbation approach lends itself to reuse of a common reference bus matrix A0 over multiple groups of states. To illustrate, the same matrix A0 can be used for two consecutive days, each having T=24 to 36 hourly states, or for even longer. Thus, in some instances, the factor(s) can be obtained without any arithmetic or matrix computation by reuse from previous work.

At process block 1120, right and left power flow perturbation factors (e.g. Xp, Yp, similar to Xk, Yk discussed above) can be computed for each of the T states using (a) the same one or more factors of A0 computed at block 1110 and (b) one or more perturbation definition arrays (e.g. Cp, Mp, similar to Ck, Mk discussed above) characterizing the respective first state of the electrical power grid. In comparison, the first method could use different factors, individually determined for respective base admittance matrices, for the different states. Because the same factor(s) can be used for all states, the second SFT method only requires factorization at block 1110 to be performed at most once total for all T states.

An Mp array describes topology perturbations of the grid. Mp can be a stack of multiple slices for respective states t, contingencies k, or combinations thereof (tk). A Cp array describes branch admittance perturbations of the grid. Cp can be a stack of multiple slices for respective states t, contingencies k, or combinations thereof (tk). The Mp and Cp arrays can be termed "perturbation definition arrays".

At process block 1130, the right and left power flow perturbation factor arrays can be combined with the candidate solutions for the grid states, to determine violations in the electrical power grid. Each candidate solution can be a vector of power injections q at transactional nodes of the electrical power grid. The violations can be violations of one or more limits ("component limits") of components in the electrical power grid, at corresponding grid states t. Finally, at block 1140, a list of the violations can be output. In varying instances, a given candidate solution can have base case violations; no base case violations but at least one contingency violation; or neither base case nor contingency violations. In some examples, testing for contingency violations can be restricted to candidate solutions having no base case violations.

Numerous variations and extensions of the second method can be implemented within the scope of the disclosed technologies, including several described herein. The states of the grid can correspond to respective future time intervals. The reference grid configuration can be the same as one of the states (e.g. state perturbation for that state can be zero), but this is not a requirement.

The perturbation definition arrays can define perturbations of the electrical power grid for the various states as base states or in a plurality of contingencies. The perturbation definition arrays can include topology perturbation arrays Mp, or admittance perturbation arrays Cp. The perturbation arrays can include first arrays indexed by the states (Mt, Ct) and second arrays indexed by the contingencies (Mk, Ck). In some examples, the perturbation arrays can also include third arrays indexed by both state and contingency (Mtk, Ctk). The third arrays can have slices for respective combinations of state t and contingency k. The number of slices in Mtk or in Ctk can be $\leq T \times \lfloor K/2 \rfloor$, where $\lfloor x \rfloor$ denotes the greatest integer less than or equal to x (sometimes known as the floor function). To illustrate, for K contingencies and T time intervals, the first method would perform computation for K contingencies in each of the T time intervals, or T·K slices altogether. Because relatively few perturbations may be dependent on both time interval and contingency, the second method can evaluate a total of T+K'+TK" slices, where K' is the number of contingencies that do not overlap with state perturbations, and K" is the number of contingencies that do overlap with state perturbations, where the total number of contingencies considered is K=K'+TK". Because K" can be much less than K (e.g. less than $\lfloor K/2 \rfloor$, often about 0.2·K, the number of slices evaluated T+K'+T·K" can be much less than T·K and considerable computation saving can be achieved. In other examples, one or both of Mp, Cp can be free of any joint perturbations, corresponding to empty or non-existent Mtk or Ctk. That is, the topology perturbations or the admittance perturbations can be completely defined by the corresponding first arrays and the corresponding second arrays, and the total number of slices evaluated can be T+K<<T·K, and further computation saving can be achieved. In some examples, some or all of the K" overlapping contingencies can be disregarded as an approximation.

In some examples the candidate solutions can be obtained from an SCUC solver, or the list of violations can be returned to an SCUC solver. The list of violations can be similar to $\{(i, k)^V\}$ discussed herein. Power flow in monitored branches can be dependent on power injection at transactional nodes. At block 1130, sensitivities of the power flows to the power injections can be determined, similar to D1, and at block 1140, the sensitivities can also be output.

In some examples, precompute for all states can be done together, and testing of solutions for all states can be done together. However, neither of these is a requirement. In other examples, one or the other of precompute or testing can be done sequentially for successive states, while still retaining certain advantages described herein. In additional examples, all calculations involving matrices or slices of size I×J or size J×J can be included in blocks 1110 and 1120, so that block 1130 can be free of any matrices or slices of these sizes.

In some examples, prior to block 1110, one or more data items can be received from sensors coupled to the electrical power grid, each of the data items indicating outage or status of one or more components of the electrical power grid. Configuration data describing the electrical power grid can be derived from the received data items and can be stored. The computation of right and left power flow perturbation factor arrays at block 1130 can be dependent, at least in part, on this stored configuration data.

In some examples, repeated iteration of process blocks 1130, 1140 on successive sets of candidate solution can result in feasible solutions for one or more of the first states. The second method can extend to causing signals to be generated which can control magnitudes of power injection at transactional nodes of the electrical power grid, according to the respective feasible solutions. Successive iterations of process blocks 1130, 1140 can reuse the power flow perturbation factors computed at block 1120.

In some examples, the right power flow perturbation factors computed at process block 1120 can include arrays $Yp^{br}$, $Yp^{bu}$ for branch and bus perturbations, associated with and having slices for respective states t, contingencies k, or joint perturbations tk. Similarly, the left power flow perturbation factors computed at process block 1120 can include arrays $Xp^{br}$, $Xp^{bu}$ for branch and bus perturbations, associated with and having slices for respective states t, contingencies k, or joint perturbations tk.

VIII. Second Example Dataflow Diagram

Figure 12A:
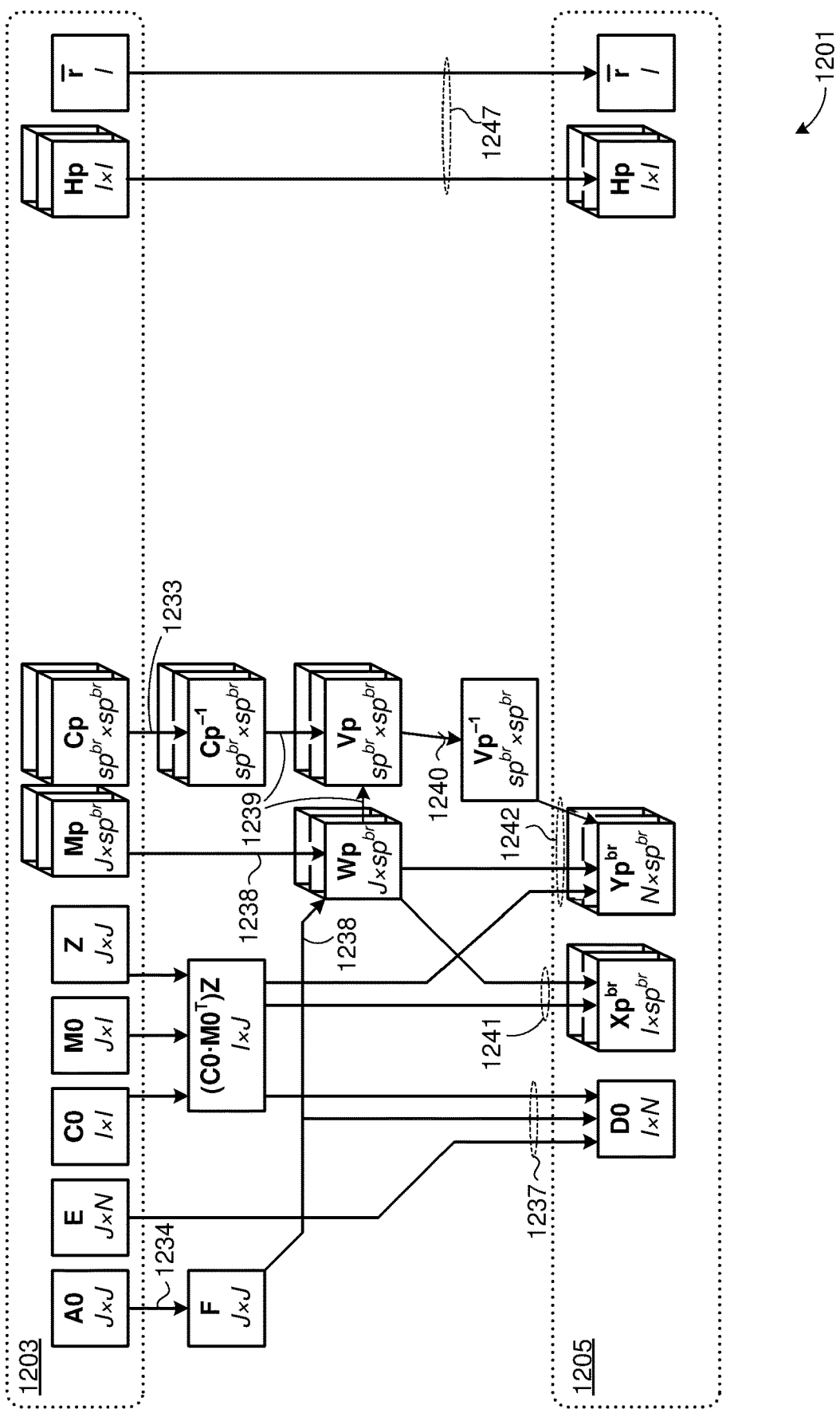
FIGS. 12A-12B are parts of a second example dataflow diagram according to the disclosed technologies.
Figure 12B:
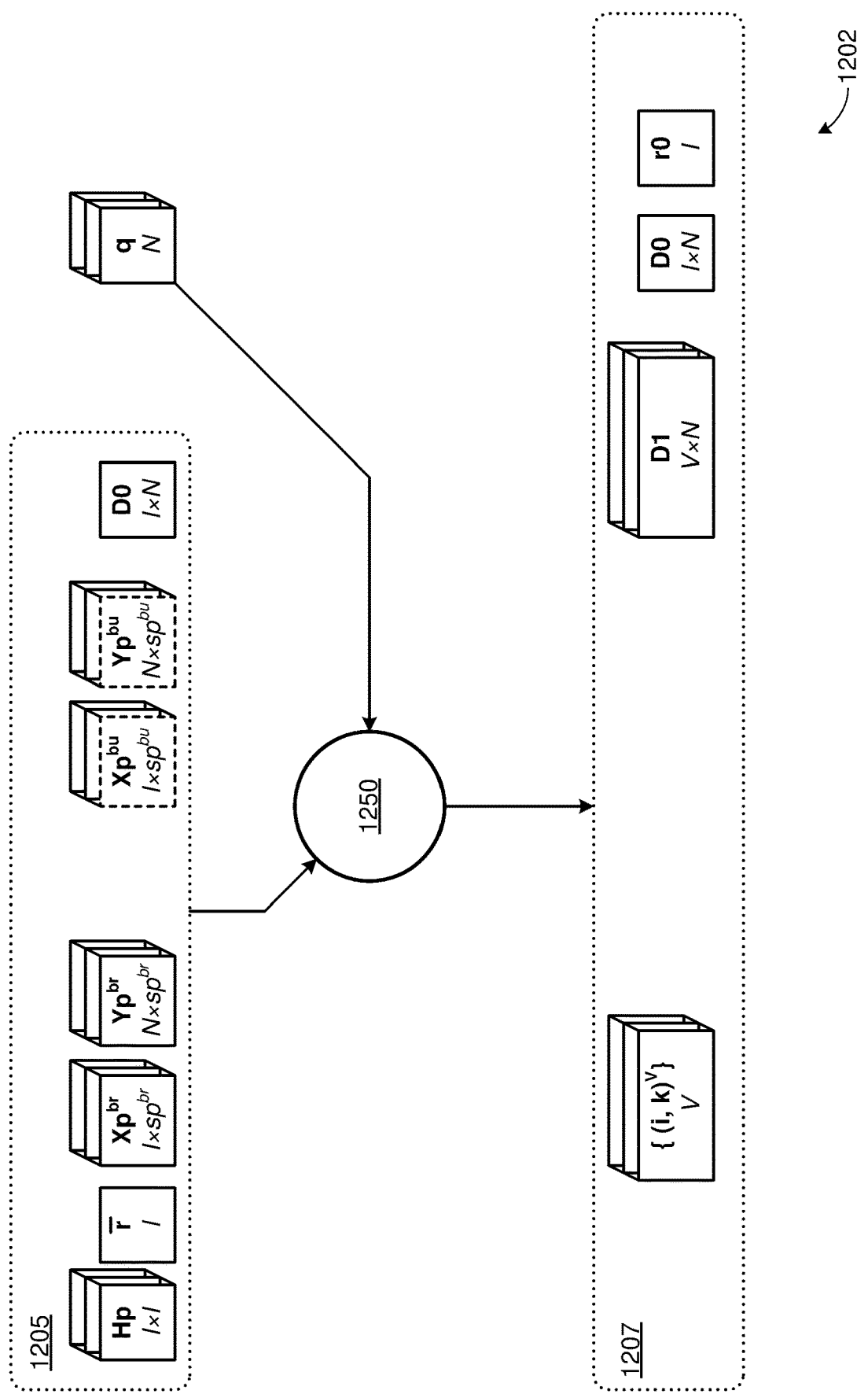

FIGS. 12A-12B are parts 1201-1202 of a second example dataflow diagram for SFT over multiple contingencies and multiple grid states. The inputs, outputs, and dataflow of FIGS. 12A-12B can generally be similar to that of FIGS. 3A-3B and, accordingly, redundant features are omitted, or described below in relation to the sections above. The notation of FIGS. 12A-12B generally matches that used elsewhere in this disclosure. The description of computations herein is illustrative: the same or similar computations can be rearranged or reordered in various ways while still producing the same or similar results. FIG. 12A illustrates a precomputation phase, while FIG. 12B illustrates a testing phase.

Starting with FIG. 12A, precomputation inputs 1203 depict configuration data similar to inputs 303 of FIG. 3A. Bus admittance matrix A (of a particular state) is replaced by reference admittance matrix A0 (common to all states). Matrices E, C0, M0, Z are similar to those of inputs 303 and are not described further. Topology change array Mp is a generalization of topology change matrix Mk described above. Whereas Mk can be instantiated for each contingency, e.g. K instances of Mk altogether, array Mp can have slices for any perturbation, which can be a state t, a contingency k, or a combination (tk). Each slice of Mp can be similar to one Mk array, having size of $J \times sp^{br}$, the latter term being the branch rank of an instant perturbation. Mp and other arrays in FIG. 12A are shown having depth, to explicitly indicate the presence of multiple slices.

Initially, Cholesky decomposition can be performed on reference admittance matrix A0 to obtain its factor F, as indicated by arrow 1234. Additionally, the low rank Ct and Ck slices (among Cp) can be inverted as indicated by arrow 1233. The rank $st^{br}$ of a Ct slice can be a small fraction of the number of bus nodes J, commonly 0.02%-2.0%, 0.05%-1.0%, or 0.1%-0.5% of J. The rank $sk^{br}$ (or $stk^{br}$) of a Ck (or Ctk) slice can be even smaller, commonly 10, 3, or often 1-2. Thus Ct, Ck, and Ctk slices (collectively, Cp slices) can be inverted without a large computational burden, e.g. using LU factorization, Gauss-Jordan elimination, partitioning, or another technique. These operations can be performed as shown below.

$$A0 \rightarrow F \tag{E8.1}$$

$$Cp \rightarrow Cp^{-1} \tag{E8.2}$$

Subsequently, intermediate matrices Wt, Vt for each state can be determined (arrows 1238, 1239). These matrices are analogous to Wk, Vk described above, and have slice sizes $J \times st^{br}$ and $st^{br} \times st^{br}$ respectively. Each matrix Wt, Vt can be regarded as slices of arrays Wp, Vp respectively. Like the Ct slices, each Vt can be readily inverted (arrow 1240) to obtain $Vt^{-1}$ or its transpose $Vt^{-T}$. The Wt, Vt can also be used to compute base case right and left perturbation factor arrays $Xt^{br}$, $Yt^{br}$ for each state t (arrows 1241, 1242), in similar manner as Equations E3.8-E3.9 above. The $Xt^{br}$ left perturbation factor arrays can have slice sizes $I \times st^{br}$ while the $Yt^{br}$ right perturbation factor arrays can have slice sizes $N \times st^{br}$. These operations can be performed as shown below.

$$Wt = F^{-T} \cdot (F^{-1} \cdot Mt) \tag{E8.3}$$

$$Vt = Ct^{-1} + (Mt^T \cdot Wt) \tag{E8.4}$$

$$Vt \rightarrow Vt^{-1}, Vt^{-T} \tag{E8.5}$$

$$Xt^{br} = [(C0 \cdot M0^T) \cdot Z] \cdot Wt \tag{E8.6}$$

$$Yt^{br} = (E^T \cdot Wt) \cdot Vt^{-T} \tag{E8.7}$$

The intermediate matrices Wt, Vt can also be used to compute perturbation factors for contingencies. For contingencies k which do not overlap perturbations of states t, $$Wtk = F^{-T} \cdot (F^{-1} \cdot Mk) - (Wt \cdot (Vt^{-1} \cdot (Wt^T \cdot Mk))) \tag{E8.8}$$

$$Vtk = Ck^{-1} + (Mk^T \cdot Wtk) \tag{E8.9}$$

$$Vtk \rightarrow Vtk^{-T} \tag{E8.10}$$

$$Xtk^{br} = [(C0 \cdot M0^T) \cdot Z] \cdot Wtk \tag{E8.11}$$

$$Ytk^{br} = (E^T \cdot Wtk) \cdot Vtk^{-T} \tag{E8.12}$$

Because of base case perturbations to the grid in states t, non-overlapping contingencies k result in intermediate arrays and perturbation factor arrays which can be different for different states t, and accordingly are designated with suffix tk in Equations E8.8-E8.12. These intermediate arrays Wtk, Vtk can have slice sizes $J \times sk^{br}$ and $sk^{br} \times sk^{br}$ respectively, while corresponding left ($Xtk^{br}$) and right ($Ytk^{br}$) perturbation factor arrays can have slice sizes $I \times sk^{br}$ and $N \times sk^{br}$ respectively.

Turning to slices tk for contingencies k which do overlap state perturbations t, the following equations can be used.

$$Wtk = F^{-T} \cdot (F^{-1} \cdot Mtk) - (Wt \cdot (Vt^{-1} \cdot (Wt^T \cdot Mtk))) \tag{E8.13}$$

$$Vtk = Ctk^{-1} + (Mtk^T \cdot Wtk) \tag{E8.14}$$

$$Vtk \rightarrow Vtk^{-T} \tag{E8.15}$$

$$Xtk^{br} = [(C0 \cdot M0^T) \cdot Z] \cdot Wtk \tag{E8.16}$$

$$Ytk^{br} = (E^T \cdot Wtk) \cdot Vtk^{-T} \tag{E8.17}$$

Equations E8.13-E8.17 are of similar form as equations E8.8-E8.12, differing in that Equations E8.13-E8.14 use overlapping slices Mtk, Ctk instead of the fewer Mk, Ck slices. These intermediate arrays Wtk, Vtk can have slice sizes $J \times stk^{br}$ and $stk^{br} \times stk^{br}$ respectively, while the corresponding left ($Xtk^{br}$) and right ($Ytk^{br}$) perturbation factor arrays can have slice sizes $I \times stk^{br}$ and $N \times stk^{br}$ respectively.

In practice temporary storage can be used for calculating Wtk. Equations E8.8-E8.12 (or E8.13-E8.17) can be calculated in a loop over tk slices. After Xtk, Ytk are computed for one slice, the same temporary storage can be reused to store Wtk for the next slice. The temporary storage can be allocated to hold the largest Wtk slice ($J \times \max(sp)$, illustratively up to about 50,000×20), a considerable saving over storing all T×K slices of Wtk (illustratively, 36,000 slices each of size at least 50,000×3).

Separating non-overlapping from non-overlapping contingencies can lead to a computational advantage in Equation E8.8. In the illustration described above, with 36 states, 800 non-overlapping contingencies and 200 overlapping contingencies, the first term on the right-hand side of Equation E8.8 can be computed 800 times for 800 k slices (contingencies), while the first term on the right-hand side of Equation E8.13 can be computed 200×36=7200 times for respective tk slices. Because each computation of $F^{-T} \cdot (F^{-1} \cdot Mk)$ can be performed with 2 solves of a linear system of equations of size Mk, the technique described above requires (800+7200)×2=16,000 solves. In contrast, a direct evaluation of Wtk for all combinations of contingency k and slices t (that is, without separating overlapping from non-overlapping contingencies) could entail 36×1000×2=72,000 solves. Inasmuch as these computations can dominate the computation of perturbation factor arrays Xtk, Ytk, a computational savings of up to about 78% can be obtained.

This completes calculation of all slices of right and left branch power flow perturbation factor arrays $Xp^{br}$, $Yp^{br}$, where $Xp^{br} \equiv \{Xt^{br}, Xtk^{br}\}$ and $Yp^{br} \equiv \{Yt^{br}, Ytk^{br}\}$.

In variations, the power flow perturbation factors can also include right and left bus power flow perturbation factors $Xp^{bu}$, $Yp^{bu}$, where $Xp^{bu} \equiv \{Xt^{bu}, Xtk^{bu}\}$ and $Yp^{bu} \equiv \{Yt^{bu}, Ytk^{bu}\}$, which can be determined in a similar manner, extending Equations E3.1-E3.3 and E3.10-E3.11 first to state slices (indexed by t) and then to joint slices (indexed tk).

Similar to FIG. 3A, perturbation mask array Hp≡{Ht, Hk, Htk} and branch constraints r⁻ can be passed intact (arrows 1247) through the precomputation phase of FIG. 12A to the testing phase of FIG. 12B. Reference sensitivity D0 can also be calculated (arrows 1237) and passed to FIG. 12B.

Turning to FIG. 12B, inputs 1205 can be obtained from the precompute phase of FIG. 12A, while candidate solutions q (vectors of power injection) can be provided at each SFT invocation (e.g. from an SCUC solver). Solutions q can have one slice for each state, e.g. 36 slices for 36 time periods. The analysis 1250 can performed as described in the context of FIG. 3B, with or without inclusion of optional bus perturbation factor arrays $Xp^{bu}$, $Yp^{bu}$ to obtain outputs 1207 including, for each state t: a list of violations $\{(i, k)^T\}$ for each state t, sensitivity matrices D1, base case sensitivities D0, or base case branch currents r0.

Numerous variations of the dataflow of FIGS. 12A-12B can be implemented within the scope of disclosed technologies, including some described in context of FIG. 2, FIGS. 3A-3B, or FIG. 11 herein. For example, there can be a tradeoff between storage space and computation speed. The perturbation factor arrays Xp, Yp permit efficient computation of perturbation branch power flow, similar to that described in context of Equations E4.2-E4.5, yet the sizes J×sp, N×sp of slices of these arrays, aggregated over T×K slices, can be substantial. In alternative examples, components X1k, X2t, X3tk can be stored in lieu of Xp, according to the following equation.

$$Xtk^{br} = X1k - X2t \cdot X3tk$$

where $X1k = [(C0 \cdot M0^T) \cdot Z] \cdot F^{-T} \cdot (F^{-1} \cdot Mk)$ $$X2t = [(C0 \cdot M0^T) \cdot Z] \cdot Wt$$

$$X3tk = Vt^{-1} \cdot (Wt^T \cdot Mk) \tag{E8.16}$$

The storage savings can be readily seen by considering each of X1k, X2t, and X3tk in turn. Slices of X1k have same sizes J×sk (illustratively, 50,000×3) as slices of Xtk, but X1k has far fewer slices (K vs. T×K, illustratively, 800 vs. 28,800). Similarly, slices of X2t have sizes J×st (illustratively 50,000×10), which can be up to about an order of magnitude larger in size than slices of Xtk, but X2t can have two to three orders of magnitude fewer slices than Xtk (T vs. T×K, illustratively 36 vs. 28,800). Finally, X3tk has as many slices as Xtk, but each slice has size of only st×sk (illustratively, 10×3), which can be much smaller than the corresponding slice of Xtk (illustratively 50,000×3). Each of X1k, X2t, X3tk is itself a left power flow perturbation factor array.

Similarly, components Y1p, Y2p, Y3p can be stored in lieu of Yp, according to the following equations.

$$Ytk^{br} = Y1k \cdot Vtk^{-T} - Y2t \cdot Y3tk \cdot Vtk^{-T}$$

where $Y1k = E^T \cdot F^{-T} \cdot (F^{-1} \cdot Mk)$ $$Y2t = E^T \cdot Wt$$

$$Y3tk = X3tk = Vt^{-1} \cdot (Wt^T \cdot Mk) \tag{E8.17}$$

Again, the storage savings can be readily seen by considering each of Y1k, Y2t, and Y3tk in turn. Slices of Y1k have similar sizes N×sk (illustratively, 2000×3) as slices of Ytk, but Y1k has far fewer slices (K vs. T×K, illustratively, 800 vs. 28,800). Similarly, slices of Y2t have sizes N×st (illustratively 2000×10), which can be up to about an order of magnitude larger in size than slices of Ytk, but Y2t can have two to three orders of magnitude fewer slices than Ytk (T vs. T×K, illustratively 36 vs. 28,800). Finally, Y3tk can be identical to X3tk, requiring no additional storage, in addition to having slices with smaller size than slices of Ytk. Each of Y1k, Y2t, Y3tk is itself a right power flow perturbation factor array.

The storage savings can be offset by additional run-time computation as indicated by Equations E8.18 (using stored Xtk, Ytk) and E8.19 (using stored components X1k . . . Y3tk).

$$rp = Hp \cdot (Xp \cdot (Yp^T \cdot q)) \tag{E8.18}$$

$$rp = Hp \cdot ((X1k - X2t \cdot X3tk) \cdot ((Y1k \cdot Vtk^{-T} - Y2t \cdot Y3tk \cdot Vtk^{-T})^T \cdot q)) \tag{E8.19}$$

IX. Third Example SFT Method

Figure 13:
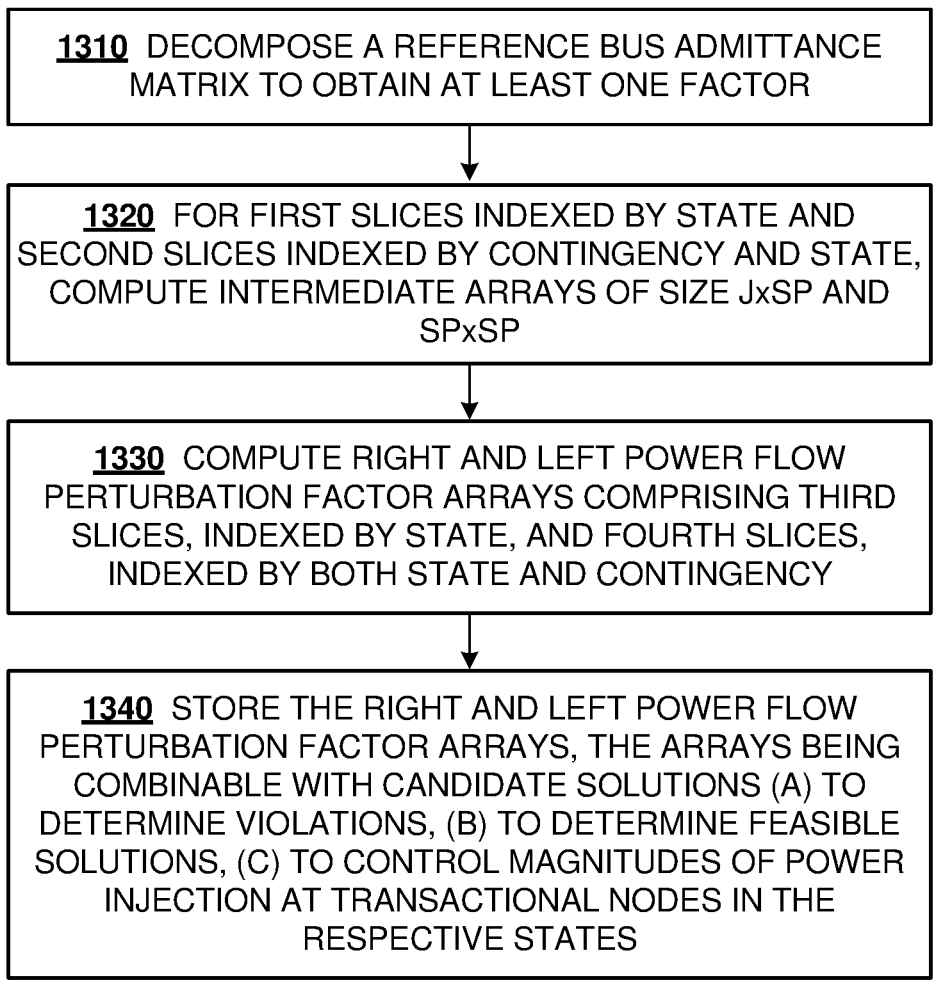
FIG. 13 is a flowchart of a third example SFT method according to the disclosed technologies.

FIG. 13 is a flowchart 1300 of a third example SFT method. In this method, intermediate arrays and power flow perturbation factor arrays are precomputed for various slices.

At process block 1310, a reference bus admittance matrix A0 can be decomposed to obtain at least one factor F. At process block 1320, intermediate arrays Wp, Vp can be computed for first slices indexed by state (to obtain slices Wt, Vt) and for second slices indexed by contingency and state (to obtain slices Wtk, Vtk). At process block 1330, right and left power flow perturbation factor arrays can be computed based on the at least one factor F and on the intermediate arrays Wp, Vp. The right and left power flow perturbation factor arrays can include third slices indexed by state and fourth slices indexed by state and contingency, and can be stored at process block 1340.

The right and left power flow perturbation factor arrays can be combinable with candidate solutions to determine violations in the electrical power grid for the candidate solutions, to determine feasible solutions among the candidate solutions, and/or to control magnitudes of power injection at the transactional nodes, in the respective states, according to the feasible solutions.

Numerous variations and extensions of the third method can be implemented within scope of the disclosed technologies, including variations and extensions described elsewhere herein. In some examples, the right and left power flow perturbation factor arrays can be combined with a given candidate solution for a given state, to determine at least one base case violation in the electrical power grid. In further examples, evaluation of contingencies can be restricted to candidate solutions having no base case violations. Responsive to determining that a particular candidate solution for a given state has no base case violations, the right and left power flow perturbation factor arrays can be combined with the particular candidate solution for the given state, to determine at least one violation a respective contingency in the given state.

The method can be extended to combining the right and left power flow perturbation factor arrays with successive sets of the candidate solutions to determine violations in the electrical power grid and feasible solutions for the respective states. Signals can be transmitted to control magnitudes of power injection at the transactional nodes in the respective states according to the feasible solutions.

X. Fourth Example SFT Method

Figure 4:
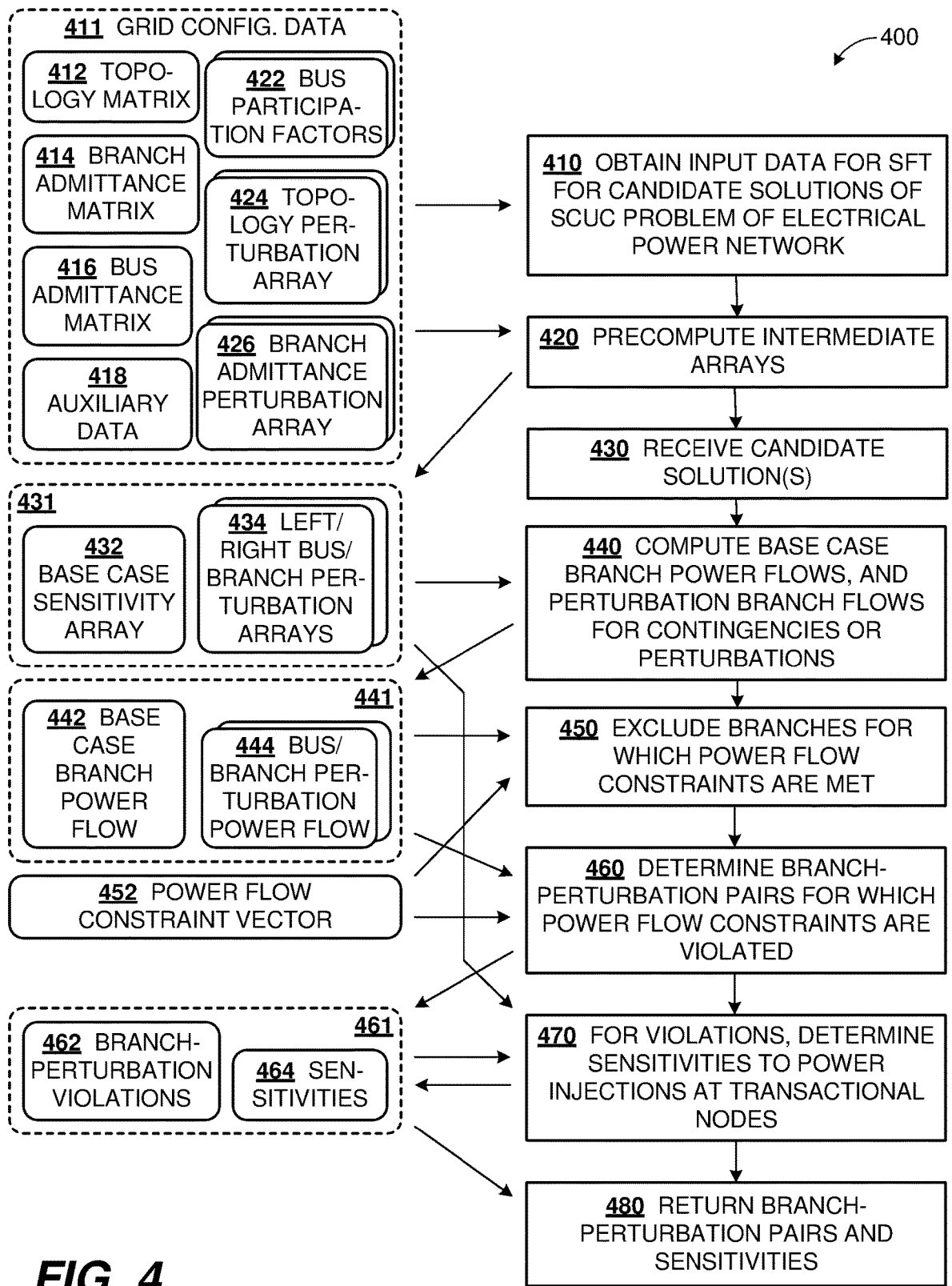
FIG. 4 is a flowchart of a fourth example SFT method according to the disclosed technologies.

FIG. 4 is a flowchart 400 of a third example SFT method. In this method, a precompute phase precedes evaluation of a candidate solution. Grid configuration data is used to precompute intermediate matrices. A candidate solution to a SCUC problem is provided along with a call from a SCUC solver. After SFT evaluation, results can be outputted. The flowchart is organized as process blocks performed by an SFT solver. These process blocks are depicted along with various input, intermediate, and output data associated with the various operations.

At process block 410, input configuration data 411 ("grid config. data") can be obtained for SFT evaluation for one or more candidate solutions of an SCUC problem of an electrical power grid. The electrical power grid can have J bus nodes, N transactional nodes, and I monitored branches. The SCUC problem can be subject to K contingencies having respective branch and bus ranks $sk^{br}$ and $sk^{bu}$. The input data 411 can include a bus admittance matrix A (416, size J×J), a branch admittance matrix C (414, size I×I), a topology matrix M0 (412, size J×I), a power flow constraint vector (452, length I). For each perturbation p, the input data can include bus participation inputs 422 for some bus nodes, a topology perturbation array Mp (424, slice size J×$sp^{br}$), and a branch admittance perturbation array Cp (426, slice size $sp^{br}$×$sp^{br}$). Other auxiliary input data 418 can also be present.

Then, at process block 420, multiple intermediate arrays 431 can be computed. These arrays can include a base case sensitivity matrix D0 (432, size I×N) and, for each contingency, left-hand and right-hand branch power flow perturbation factor arrays (434, slice size I×$sp^{br}$, N×$sp^{br}$ respectively), and left-hand and right-hand bus power flow perturbation factor arrays (434, slice size I×$sp^{bu}$, N×$sp^{bu}$ respectively). The intermediate arrays 431 can be stored persistently for reuse on multiple SFT invocations during solution of a particular SCUC problem.

Following precompute block 420, the SFT solver can be ready to handle one or more candidate solutions. At block 430, such candidate solution(s) can be received. The candidate solution(s) can be evaluated at process blocks 440, 450, 460, 470. At block 440, the intermediate arrays 431 are operated on the candidate solution to obtain a base case branch power flow vector (442, length I) and perturbation bus or branch power flows 444 for bus perturbations or branch perturbations of the various states or contingencies, as vectors (length I). In some examples, the flow vectors 444 can be stacked as a 2-D matrix or a 3-D array as described herein. The outputs of block 440 are collectively indicated in dashed outline 441.

At block 450, the various branches can be tested, using outputs 441 and the power flow constraint vector 452, to ascertain certain branches for which power flow constraints are satisfied for all contingencies. These branches can be excluded from further analysis.

Then, at block 460, the remaining branches can be individually analyzed to determine which branch-perturbation pairs have a violation of the respective power flow constraint. These branch-perturbation pairs 462 can be V in number. The determination at block 460 can be made by combining outputs 441 with the power flow constraint vector 452. A branch-perturbation pair can be a combination of a branch and a contingency (for a given state) or a combination of a branch and a state (e.g. base case of that state).

Additionally, at block 470, sensitivities to power injections at the transactional nodes can be determined for each violated branch-perturbation pair. These sensitivities can be organized as a matrix D1 (464) of size up to V×N. Matrix D1 464 can have a smaller size in examples where not all sensitivity terms are calculated. In some examples, D1 can always be returned with N columns. In further examples, D1 can be returned with varying number of rows according to whether all V violations are returned, or only a subset (e.g. maximum violation for each branch).

At process block 480, the branch-perturbation violation pairs 462 and the sensitivities 464 (shown collectively as dashed outline 461) can be returned to a calling SCUC solver. In some examples, the base case sensitivity matrix 432 or the base case branch power flows 442 can also be returned as part of output 461.

Numerous variations of this method can be implemented. For example, the matrix computations can be organized differently, or different matrix sizes can be used. In some examples, at least one of the input data matrices described above can have the indicated size. In other examples, topology perturbation array Mp (424) and branch admittance perturbation matrix Cp (426) can have the sizes indicated. In further examples, base case sensitivity matrix can have the indicated size; branch perturbation arrays can be provided as left and right factors $Xp^{br}$, $Yp^{br}$ having the sizes indicated for one or more states, contingencies, or joint perturbations; or the left and right branch perturbation matrices can be stacked into 3-D arrays $Xs^{br}$, $Ys^{br}$ having respective dimensions I×s×$sk^{br}$ and N×s×$sk^{br}$ or a permutation thereof.

XI. First Example SCUC Method

Figure 5:
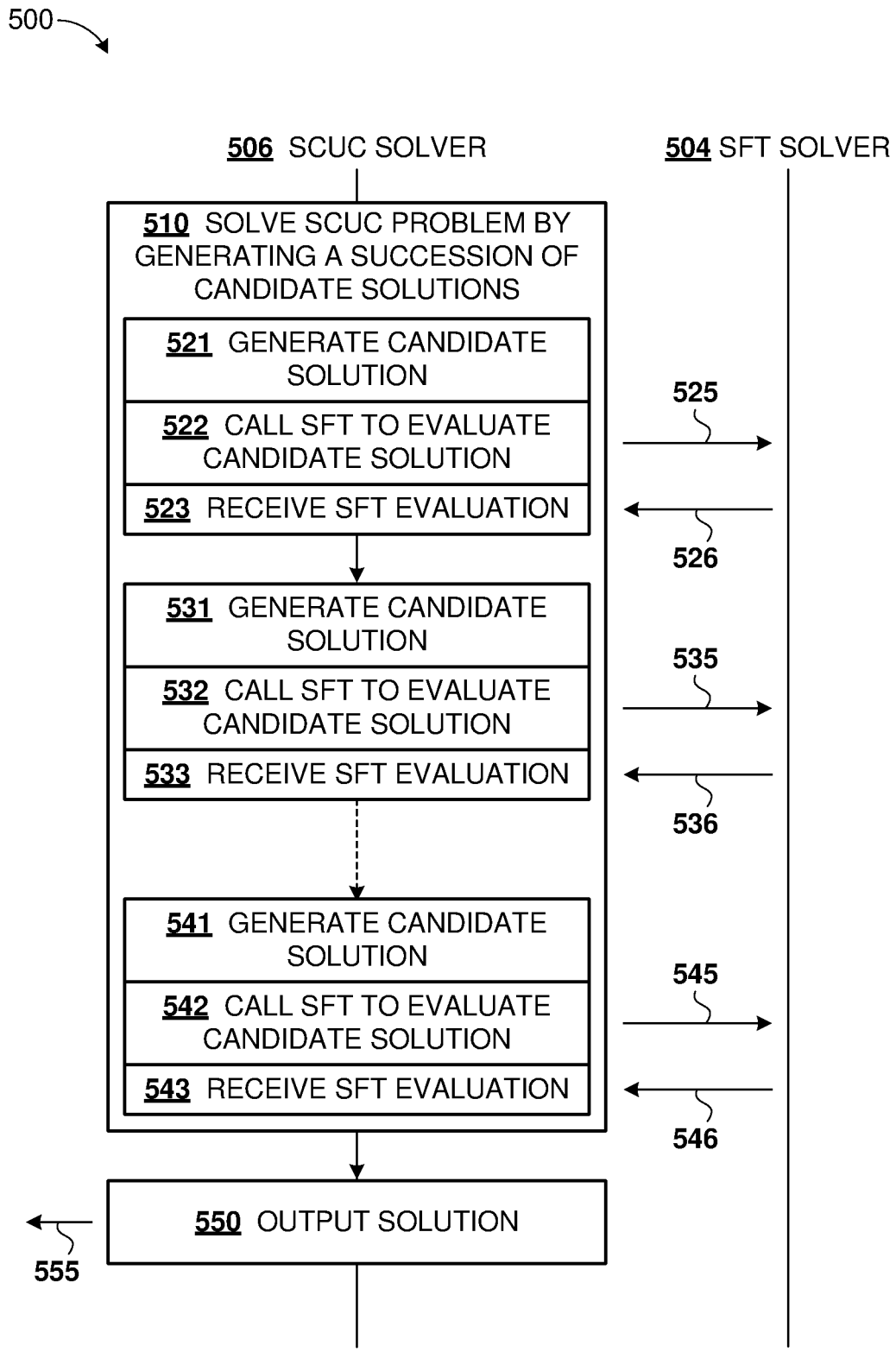
FIG. 5 is a flowchart of a first example SCUC method according to the disclosed technologies.

FIG. 5 is a flowchart 500 of a first example SCUC method. In this method a SCUC solver makes multiple calls to a disclosed SFT solver, to arrive at a validated solution in a single pass over a search space. The process blocks of this method can be performed by SCUC solver 506. For clarity of illustration, SFT solver 504 is also depicted, however SFT solver 504 is not a necessary part of the illustrated method.

At process block 510, a SCUC problem is solved by generating a succession of candidate solutions. Block 510 can represent a single pass of a branch-and-bound search over a high-dimensional space of power grid variables. Within block 510, process blocks 521-523, 531-533, and 541-543 represent groups of operations associated with respective candidate solutions among the succession of candidate solutions.

At process block 521, a first candidate solution can be generated. As described herein, this candidate solution can be generated using a branch-and-bound procedure, however this is not a requirement, and other SCUC solution techniques can also be used. At process block 522, SFT solver 504 can be called for the first candidate solution, as indicated by arrow 525. Correspondingly, at process block 523, results of the SFT evaluation can be received (arrow 526) from SFT solver 504.

The SCUC solver can continue its search procedure. In some examples, one or more violated constraints determined and returned by SFT solver 504 on the first candidate solution can be added to the SCUC problem. In further examples, one or more sensitivities determined and returned by SFT solver 504 can be applied to an instant candidate solution and used to guide the SCUC solution process. For example, with the sensitivities associated with one or more particular violated constraints, the SCUC solver can make corresponding adjustments to power injections at transactional nodes, that would render the associated contingency compliant with those violated constraints.

Different violations can be addressed differently within block 510. A first set of violations can be addressed by adding associated constraints to the SCUC problem, a second set of violations can be addressed by using sensitivities to adjust power injections at transactional nodes, while a third set of violations can remain unaddressed at a particular stage. In some examples, only certain top-ranking violations can be addressed by the SCUC solver 506. These top-ranking violations can be those having greatest percentage violation of their associated constraint, greatest magnitude violation of power flow, or ranking according to another metric. Branches can be given weight according to their criticality within the power grid, and such weights can be incorporated into ranking of violations. For example, a transmission line on a main corridor can have greater weight than a distribution line to a small load. The number of violations addressed at a SCUC stage can be a predetermined number of top-ranking violations, or violations having a score above a predetermined threshold. The number of violations addressed can vary over the course of block 510. For example, during initial stages, only one or a few top-ranking or most-critical violations can be addressed, so as to keep the computation burden of the SCUC procedure within a bound. At later stages, when the SCUC procedure is close to convergence, more violations can be addressed to accelerate the convergence of the SCUC procedure in fewer steps, albeit with greater computational burden at each step.

In this manner, process block 510 can continue until a second candidate solution is generated at block 531. As before, SFT solver 504 can be called at process block 532 for the second candidate solution, as indicated by arrow 535, and results of the SFT evaluation can be received (arrow 536) at process block 533. Violations can be addressed as described above, and process block 510 can proceed in a similar manner, eventually generating a (last) candidate solution at block 541.

At block 542, SFT solver 504 can be called again, as indicated by arrow 545, and one or more results can be received at block 543 (arrow 546). Unlike previous calls, the results from the SFT evaluation can satisfy a termination condition, upon which block 510 can complete, and the solution of block 541 can be outputted at process block 550. Outputting a solution can take various forms. In some examples, the solution can be returned to a supervisory computer program, such as a program performing market clearing for a day-ahead market. In other examples, the solution can be outputted for storage on a hard-disk or other computer-readable media. In further examples, the solution can be output by transmission over a network to another computing system.

In some examples, SCUC solver 506 can make a determination that the SCUC problem is solved. SFT solver 504 can check for violations and can return violations as described herein. In varying examples, violations can be defined differently, or different criteria can be applied for violations to be returned by SFT solver 504. In some examples, violations can be defined for all tuple (i, k, T) for which flow on branch i violates a respective constraint for contingency k (including k=0 for the base case) at period T. In other examples, violations can be defined for tuples (i, T) i.e., the most violated power flow over all contingencies for branch i at period T. In varying examples, the SCUC problem can be determined to be solved when no new violated constraints are reported by the SFT solver 504, or when there are no violated constraints at all (i.e. all security constraints are satisfied). That is, the iterations between SCUC solver 506 and SFT solver 504 can stop upon having no violations returned by SFT solver 504, or upon having no new violations returned from SFT solver 504.

However, process block 510 can terminate according to a variety of termination conditions. As described above, the SFT evaluation received at block 543 can indicate that all constraints are satisfied and that there are no violations of any evaluated contingency. In that case, the solution of block 541 can be deemed to be a satisfactory solution to the solved SCUC problem. In other examples, SCUC solver 506 can execute a two-pronged approach. In one prong, SCUC solver 506 can search for successively improved solutions according to an objective function for the power grid. In another prong, SCUC solver 506 can progressively evaluate a bound for how good a solution is possible. Considering for purpose of illustration that a lower value of the objective function is better, the bound can be a progressively increasing lower bound. If the figure of merit is within a threshold of the bound, then SCUC solver 506 can determine that no significant improvement is possible, the SCUC problem can be deemed solved, and the solution of block 541 can be returned as a best-possible solution, even if not all constraints are satisfied, or if some contingency violations remain. In further examples, SCUC solver 506 can reach a force termination based on e.g., reaching or exceeding a computing time limit.

Numerous variations and extensions of the first SCUC method can be implemented within the scope of the disclosed technologies, including several described herein. For example, calls to SFT solver 504 (e.g. arrows 525, 535, 545) can be made selectively, i.e. other candidates can be generated in block 510 for which SFT is not evaluated. The selective invocation of SFT can be based on amount of improvement from an incumbent solution (e.g. an improvement in the objective function below a threshold can be used as a criterion to skip a further SFT call), can be periodic (e.g. every third candidate solution can have SFT invoked), or can be based on elapsed computer time since the immediately preceding invocation of SFT. The criterion for selective SFT invocation can dynamically evolve over the course of process block 510.

XII. Second Example SCUC Method

Figure 6:
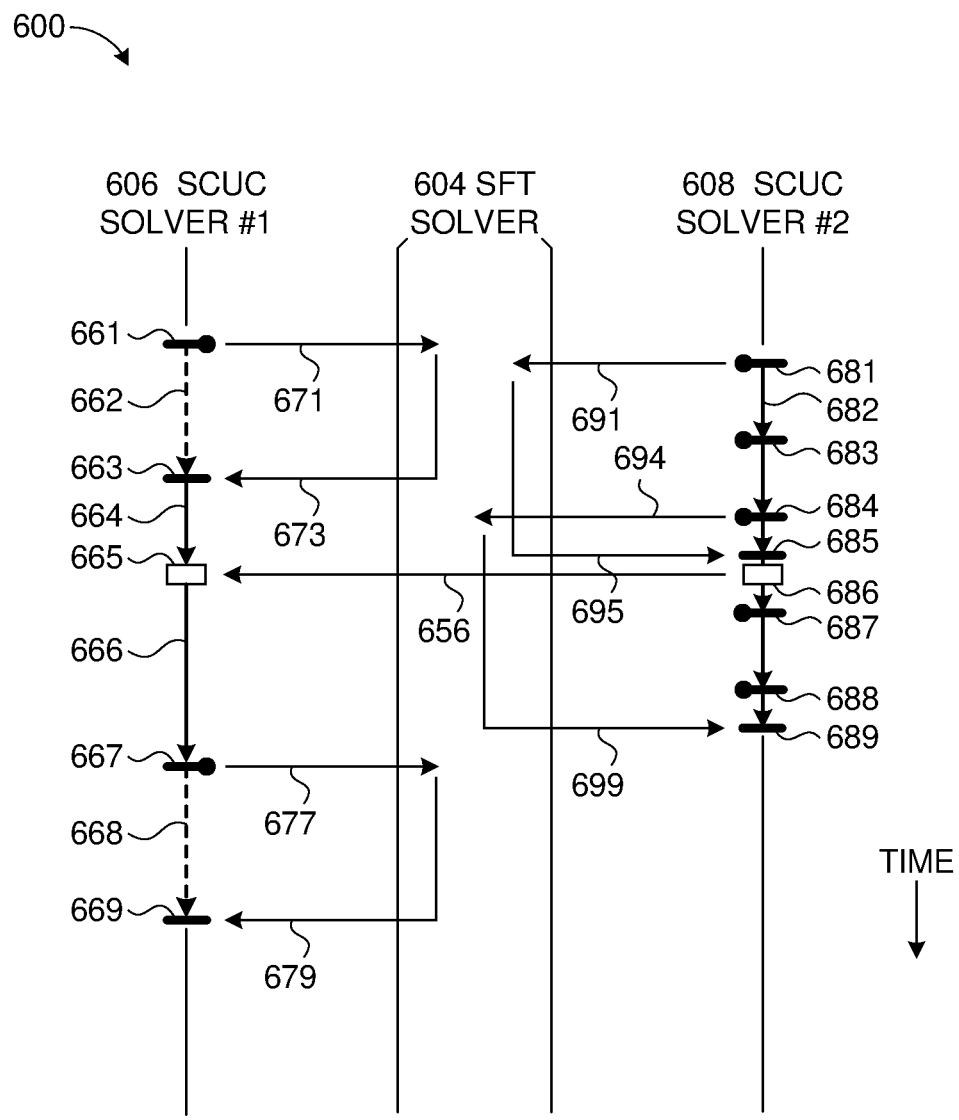
FIG. 6 is an interaction diagram of a second example SCUC method according to the disclosed technologies.

FIG. 6 is an interaction diagram 600 of a second example SCUC method. In this method, two SCUC solvers 606, 608 share an SFT solver 604 which can be implemented as a service. In diagram 600, SFT solver 604 is represented as a vertical band, while SCUC solvers 606, 608 are each represented as single vertical lines. Time progresses downward.

Starting with SCUC solver #1 606, bar 661 indicates determination of a candidate solution, which is transmitted to SFT solver 604 at arrow 671. In time, SFT solver 604 can evaluate the candidate solution 661 and return evaluation results as indicated by arrow 673. The returned results are indicated on the timeline of SCUC solver #1 606 by bar 663. That is, in diagram 600, bars with bullet ends, like 661, indicate a new candidate solution, while bars with plain ends, like 663, indicate SFT evaluation results for an associated candidate solution. Between bars 661 and 663, dashed arrow 662 indicates that SCUC solver #1 606 can be idle. That is, SCUC solver #1 606 blocks upon SFT call 671, resuming operation when evaluation results are received at 673. Similarly, SCUC solver #1 606 can determine another candidate solution at 667, call for SFT evaluation (arrow 677), and block (arrow 668) until evaluation results are received at bar 669. The SFT solver 604 can duly evaluate the candidate solution and return results (arrow 679).

Concurrently, SCUC solver #2 608 can generate candidate solutions at bars 681, 683, 684, 687, and 688. Unlike SCUC solver #1 606, SCUC solver #2 608 can invoke SFT selectively for candidate solutions 681 and 684, and can omit SFT evaluation for candidate solutions 683, 687, 688. Candidate solutions 681, 684 can be transmitted to SFT solver 604 at arrows 691, 694 respectively, and evaluation results can be returned via arrows 695, 699 at bars 685, 689 respectively.

SCUC solver #2 608 also does not block while waiting for SFT evaluation results, as indicated by solid arrows such as 682. That is, SCUC solver #2 608 can continue searching for improved solutions while waiting for the evaluation results from candidate solution 681. Once these evaluation results are received at bar 685, some among any detected violations can be addressed as described herein, adding constraints or modifying a solution to avoid a contingency violation.

Further, at block 686, SCUC solver #2 608, can prepare a packet and transmit it to SCUC solver #1 606, as indicated by arrow 656 to block 665 on the timeline of SCUC solver #1 606. That is, SCUC solvers 606, 608 can cooperate in the solution of a common SCUC problem. The transmitted packet can be based at least partly on the SFT evaluation results received at bar 685. The transmitted packet can include information related to contingency violations or violations of constraints in a base case, information about the candidate solution 681, information about a lower bound for achievable figure of merit, or other information regarding progress of SCUC solver #2 608 in its search space. Although diagram 600 shows a single communication between SCUC solvers 606, 608, this is not a requirement. In other examples, there can be multiple communications between SCUC solvers 606, 608, or packet transmissions in both directions.

Numerous variations and extensions of this method can be implemented within the scope of the disclosed technologies, including several described herein. For example, SCUC solvers 606, 608 can solve the same SCUC problem, e.g. for a particular hour of a day ahead market on a same power grid. In other examples, SCUC solvers 606, 608 can solve different problems on the same power grid, for example the hours starting at 2 pm and 3 pm respectively. By utilizing staggered starts, the earlier running SCUC solver can aid the later running SCUC solver to converge more quickly on its solution. In further examples, SCUC solvers 606, 608 can cooperatively tackle different portions of a search space for a single SCUC problem. SCUC solvers 606, 608 can utilize different computational techniques, or can utilize a same technique with different strategies or configurations.

XIII. Third Example SCUC Method with SCED Integration

Figure 7:
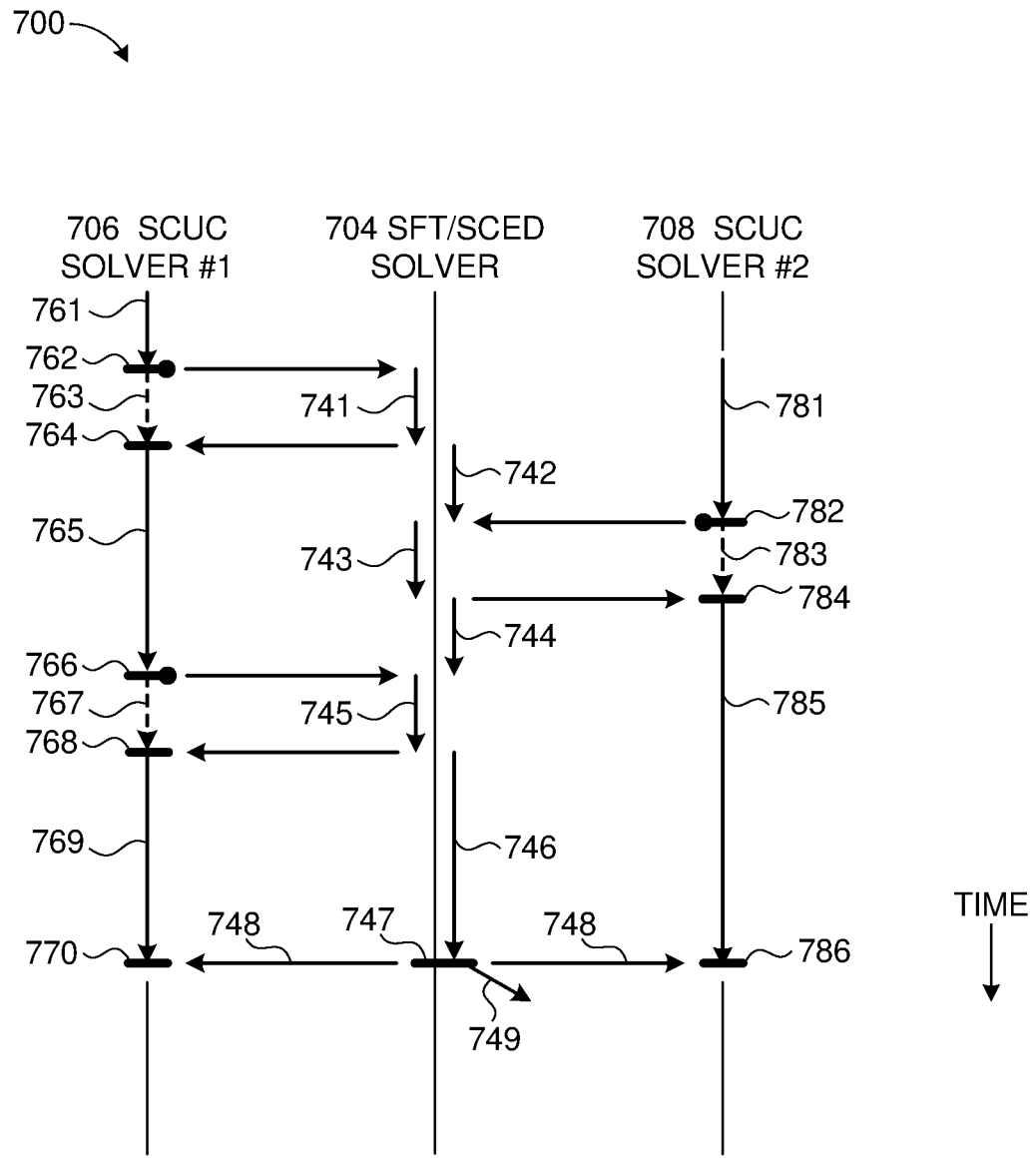
FIG. 7 is an interaction diagram of a third example SCUC method according to the disclosed technologies.

FIG. 7 is an interaction diagram 700 of a third example SCUC method integrated with a parallel Security-Constrained Economic Dispatch (SCED) optimization process. In this method, SCUC solvers 706, 708 evaluate a SCUC problem, while solver 704 alternates between (i) providing SFT as a service to the SCUC solvers 706, 708, and (ii) performing continuous optimization and refinement of a corresponding SCED problem. The SCED solver 704 is tasked with setting dispatch value and prices for participants on a power grid, and can factor in transitions and ramp rates between one market period and the next. The illustrated configuration is exemplary. More or fewer SCUC solvers can be used, or the SFT and SCED processes can run on separate computers.

SCUC solver #1 706 can perform an optimization process using branch-and-bound or another technique at 761, leading to a candidate solution at 762. A request for SFT evaluation for this candidate can be issued, and SCUC solver #1 706 can block (763) until the SFT evaluation is received at 764. The SCUC process can continue (765) and a second candidate solution can be generated at 766, for which SFT evaluation can also be requested. SCUC solver #1 706 can block (767) until the SFT evaluation is received at 768. SCUC solver #1 706 can continue (769) until a termination command 748 is received at 770.

Turning to the SFT/SCED solver 704, the candidate solution from SCUC solver #1 706 at 762 can be evaluated (741), and evaluation results can be returned to solver #1 706. At this point, SFT/SCED solver 704 can pick up the SCED process (742) until another SFT request is received from SCUC solver #2 708 at 782. This candidate can be evaluated at 743, and the result returned to solver #2 708 at 784, at which point, SFT/SCED solver 704 can resume the SCED process (744), until the request to evaluate candidate 762 causes solver 704 to switch back to SFT evaluation. Finally, SFT/SCED solver 704 can continue the SCED process until successful termination at 747. The SCED problem having been solved, further SCUC optimization can be unnecessary, and termination signals 748 can be sent to SCUC solvers 706, 708. The final solution can be outputted at 749.

SCUC solver #2 708 can perform SCUC optimization in parallel with solver #1 706. Solvers 706, 708 can use a same technique with different configuration parameters, or can use different optimization techniques. Solver #2 708 can perform optimization at 781, 785, and can block at 783, waiting for an SFT evaluation on a candidate solution generated at 782, until the SFT evaluation is received from SFT/SCED solver 704 at 784. Like solver #1 706, solver #2 708 can terminate at 786 in response to termination signal 748.

Through the interactions described, the SCED optimization of solver 704 can receive successive candidate solution inputs and security constraints from SCUC solvers 706, 708, which allows the SCED optimizer 704 to continuously refine and optimize the SCED problem. Operating in conjunction with SCUC and SFT processes, a certified feasible and refined SCED solution can be delivered at 749. Additionally, the illustrated configuration allows a single SFT solver to concurrently support multiple SCUC processes, which is an additional saving in computing resources, compared to having individual SFT processors for each of multiple SCUC solvers. Further, in some examples, SFT solver 704 can maintain a queue of candidate solutions awaiting evaluation.

Numerous variations can be implemented. In one example, a SCED solver can incorporate constraints based on violations determined by the SFT evaluation. The SCED solver can use these constraints to solve the SCED problem with continuous refinement, and can output a certified feasible, refined solution. In further examples, this solution can be provided as input to a concurrent optimizer, along with solutions from one or more SCUC solvers.

XIV. Examples of Innovative Features

In this section, some innovative features are summarized, for speeding up SFT and for integrating SFT with SCUC.

1. SFT Formulated Based on Power Injection at Transactional Nodes

Input vector q can be received as a vector of length N rather than J, and accordingly right-hand factors $Yk^{br}$, $Yk^{bu}$ for perturbation power flows can also have size N×sk rather than J×sk. For typical power grids, this can provide a direct reduction in matrix size by about a factor of 10, as compared with conventional technology. The smaller data structures also result in faster multiplication at operations L401-L403.

2. Sensitivities Computed Directly with Respect to Power Injection at Transactional Nodes The evaluation of contingency sensitivities D1 at operations L412, L414 can be performed directly for transactional nodes, rather than computing sensitivities for various bus nodes and subsequently transforming from bus nodes to the transactional nodes of interest. This provides savings through precomputation of the right and left branch perturbation current factors Xk, Yk enabling efficient calculation of components of matrix D1. Further savings are provided by operating on matrices of size N rather than size J.

3. Intermediate Matrices Precomputed

Operations with large matrices (e.g. A, E, C0, M0, Z) can be absorbed into precomputation as at operation L201, so as not to be required repeatedly at each candidate evaluation L204. This can include Cholesky factorization of bus admittance matrix A. Relative to a host SCUC problem, the precomputation can be performed in parallel with SCUC model generation and initial computations, thereby avoiding a burden on even the first SFT call. The consolidation of precompute operations also results in avoidance of bus phase angle calculations during the candidate evaluation L204.

3A. Intermediate Matrices Precomputed for Branch Power Flows

A significant portion of SFT computation can be in computation of contingency branch power flows as at operations L402-L405. By providing intermediate matrices Xk, Yk (superscripts br, bu omitted for simplicity), the bulk of computation operations (e.g. operations L306-L314) can be removed from the candidate evaluation of operation L204, and can be performed just once for the SCUC problem at operation L201. The resulting advantage allows SFT to be called many more times within a given time budget, which in turn multiplies the savings due to precomputation.

4. Matrix Multiplications Organized to Use Smaller Matrices, Reducing Storage or Computation Intermediate matrices can be organized to use smaller matrices than conventional approaches. In some examples, two smaller matrices can be advantageously used instead of one larger matrix. For example, left and right factors Xk, Yk (superscripts br, bu omitted for simplicity) have sizes of I×sk, N×sk respectively. To illustrate, with I=20,000, N=2,000, and sk=10, Xk and Yk together can have 220,000 data fields. In comparison, $Xk \cdot Yk^T$ would have 40 million data fields. The reduction in storage required is a factor of 200. Furthermore, the calculation $Xk \cdot (Yk^T \cdot q)$ can be performed in two matrix multiplications, the first is of size (sk×N)·(N×1) and requires N·sk operations, while the second is of size (I×sk)·(sk×1) and requires I·sk operations. In the illustration above, the total number of operations is about 220,000. In comparison, a conventional evaluation $(Xk \cdot Yk^T) \cdot q$, with the parenthetical term being a precomputed 20,000×2,000 matrix, results in a single matrix multiplication of size (I×N)·(N×1), requiring I·N operations, which is about 40 million operations in the present illustration. Thus, the reduction in computation is about a factor of 180. That is, computation at operations L402, L403 can be reduced by about 99.5%.

Computation improvements of a similar nature can be obtained during precomputation as well. For a similar illustration as above, the computation savings of computing $F^{-T} \cdot (F^{-1} \cdot Mk)$ at operation L306 can be about 99.9% (computation reduction by a factor of 1000) compared with computing $(A^{-1} \cdot Mk)$ in a conventional approach.

Still further, storage of components X1k . . . Y3kt, as described in context of Equations E8.16-E8.17 and E8.19, can reduce storage required for power flow perturbation factor arrays by 1-2 orders of magnitude.

5. Contingencies Grouped According to Bus or Branch Rank

In some examples, the left and right factors Xk, Yk can be stacked into 3-D arrays as described in context of arrows 348 of FIG. 3B. To illustrate, with K=1000 and 10 different values of sk, instead of evaluating perturbation power flows separately for each of 1000 contingencies, the arrays Xs, Ys allow bulk evaluation with 10 sets of 3-D arrays. Although the number of individual operations required for array multiplications can be about the same in either case, as a practical matter the use of 3-D arrays can be significantly faster through the use of optimized libraries for array computation.

6. Branches without Contingency Violations Identified and Pruned

As discussed in context of arrows 348 of FIG. 3B, contingencies can be aligned differently within the stacks $Xs^{br}$ and $Xs^{bu}$. Accordingly, realigning the contingencies for efficient computation of branch flow currents r1 can involve computationally intensive permutations of slices of an rs array. However, in typical cases, there is significant margin between the base case branch flows r0 and the power flow constraint r̄ for most branches i. Therefore, as described in context of operation L404, the minimum and maximum values of branch perturbation current can be computed across all contingencies for a given branch i, without requiring any matrix permutation or slice extraction. In this way, the $I^{OK}$ branches, which are free of any contingency violations, can be separated from a relatively small number of branches which could have contingency violations, without actually computing r1 for any branch or contingency. Then, the relatively compute-intensive operations of re-ordering and summing the components of r1, as at operation L405, can be limited to just the remaining branches.

7. Calls to SFT Embedded within One Pass of an SCUC Procedure

Fast SFT can be embedded within a single pass of a SCUC procedure such as a branch-and-bound search. Because incorporation of constraints can significantly slow down internal steps of a branch-and-bound search, fast SFT allows the search to initially be performed efficiently with very few constraints, and additional constraints gradually added subsequently, as needed, based on SFT results. In one view, incorporation of constraints that are not going to be violated into SCUC leads to a waste of computation resources. The embedded SFT calls allow only necessary constraints to be incorporated, leading overall to significant speed-up in the SCUC solution process. Still further, better quality SCUC solutions can be obtained in a single pass, compared to multiple slow passes in conventional approaches.

Because the SFT is very fast, multiple SFT calls from SCUC do not incur a large runtime burden. Whereas, by allowing the SCUC procedure to complete in a single pass, a large saving in total computation can be realized.

8. Calls to SFT Integrated with a Continuous Optimization SCUC Solver

SFT can be integrated with parallel SCUC and SCED solvers as described in context of FIG. 7, to efficiently produce a certified, refined solution to a SCED problem. Because SCED can be solved as a linear programming problem, which can be faster than a SCUC solution using MIP or branch-and-bound, the SCED+SFT approach can provide additional reduction in required computation.

9. Multiple Grid States Treated as Perturbations of a Reference Grid Configuration Treating states (time periods) as perturbations of a reference grid configuration allows just one factorization of a bus admittance matrix to serve for 36 (or even more) states of the grid.

10. Decoupling Contingencies from State Perturbations

Separating the relatively few contingencies that overlap state perturbations from non-overlapping contingencies can reduce storage and computation required for the latter by about 1-2 orders of magnitude.

XV. Example Interfaces with an Electrical Power Grid

In some examples, the methods and apparatus described in this disclosure can be integrated with equipment of an electrical power grid. For example, grid configuration data utilized by a disclosed SFT or SCUC solver can be obtained based on inputs from sensors of the electrical power grid. Software instructions of disclosed embodiments can cause a hardware processor to receive sensor data indicating outage or status of one or more components of the electrical power grid. The received sensor data can be incorporated into configuration data (e.g. reference matrices A0, M0, C0, or perturbation definition arrays Mt, Ct) associated with the electrical power grid. The configuration data can be stored in a configuration data store. The SFT or the SCUC problem can be configured based at least partly on the stored configuration data. Operations of an SFT solver, such as pre-computation, can be based at least partly on the stored configuration data.

As another example, outputs from an SFT or SCUC solver can be used to control actuators within the electrical power grid, to achieve operation according to grid configuration solutions obtained by the SCUC and SFT solvers, or to alleviate constraints at risk of violation. Based on an SFT evaluation or a SCUC solution, a processor associated with disclosed embodiments can send a signal that causes the power grid to control a magnitude of power injection at a load or generator coupled to the electrical power grid during a future time period associated with the SCUC problem or the SFT evaluation. The signal can be based on a list of violations determined by SFT, and can operate an actuator of the electrical power grid so as to alleviate or avoid one or more of the contingency violations. For example, a transmission line carrying power from a generator can be within constraints for the base case, but could be at 110% of its constraint in a particular contingency. By reducing the injected power from the generator by at least 10% of the constraint value, safe operation can be achieved both in the base case and in the particular contingency.

XVI. Additional Examples

The following are additional examples of the disclosed technologies.

Example 1 is one or more computer-readable media including stored instructions executable by one or more hardware processors for feasibility testing on a plurality T of candidate solutions for an electrical power grid, wherein the candidate solutions are indexed by T respective states of the electrical power grid, and the stored instructions include: first instructions that, upon execution, obtain one or more first factors of a reference bus admittance matrix of the electrical power grid; second instructions that, upon execution, compute right and left power flow perturbation factor arrays for each of the T states based on: the one or more first factors; and one or more perturbation definition arrays characterizing perturbations of the electrical power grid for the respective state; and third instructions that, upon execution, combine the right and left power flow perturbation factor arrays with the candidate solutions, to (i) determine violations of one or more component limits in the electrical power grid, and (ii) cause a list of the violations to be outputted, wherein each of the candidate solutions includes a vector of power injections at transactional nodes of the electrical power grid.

Example 2 includes the subject matter of Example 1, and further specifies that the stored instructions further include: fourth instructions that, upon execution after multiple iterations of the third instructions, result in respective feasible solutions for the states, and cause the electrical power grid to control magnitudes of power injection at the transactional nodes of the electrical power grid in the states according to the respective feasible solutions.

Example 3 includes the subject matter of any of Examples 1-2, and further specifies that the states are respective future time intervals.

Example 4 includes the subject matter of any of Examples 1-3, and further specifies that the perturbation definition arrays define perturbations of the electrical power grid in the states and in a plurality of contingencies, and include first arrays indexed by the states and second arrays indexed by the contingencies independent of the states.

Example 5 includes the subject matter of Example 4, and further specifies that the perturbations of the electrical power grid are completely defined by the first arrays and the second arrays.

Example 6 includes the subject matter of any of Examples 4-5, and further specifies that the perturbation definition arrays include: first branch admittance perturbation arrays indexed by the states; second branch admittance perturbation arrays indexed by the contingencies; first topology perturbation arrays indexed by the states; and second topology perturbation arrays indexed by the contingencies.

Example 7 includes the subject matter of any of Examples 4-6, and further specifies that: the perturbation definition arrays further include third topology perturbation arrays indexed by both respective states of the states and respective contingencies of the contingencies, each of the third topology perturbation arrays including a plurality of slices for respective combinations of one of the states and one of the contingencies; at least a positive integer number K of the contingencies are tested for each of the T states; and a number of the slices is less than or equal to $T \times \lfloor K/2 \rfloor$.

Example 8 includes the subject matter of any of Examples 1-7, and further specifies that the execution of the first instructions performs Cholesky decomposition of the reference bus admittance matrix.

Example 9 includes the subject matter of any of Examples 1-8, and further specifies that: I is a first number of monitored branches in the electrical power grid; J is a second number of buses in the electrical power grid; and all calculations involving matrices of size I×J or size J×J are included in the first instructions.

Example 10 includes the subject matter of any of Examples 1-9, and further specifies that the execution of the second instructions further computes respective intermediate arrays having slices of size J×st for each of the T states, wherein J is a number of busses in the electrical power grid and st is a branch rank of perturbations to the electrical power grid in the respective state.

Example 11 includes the subject matter of Example 10, and further specifies that the execution of the second instructions further computes intermediate arrays having slices of size J×sk for respective combinations of a state of the T states and a contingency, of a plurality of contingencies, having branch rank sk.

Example 12 includes the subject matter of any of Examples 1-11, and further specifies that the execution of the second instructions: further stores a first array of the left power flow perturbation factor arrays, the first array including a plurality of slices indexed by contingency and having size size J×sk, wherein J is a number of buses in the electrical power grid and sk is a branch rank of the contingency; further stores second and third arrays of the right power flow perturbation factor arrays, wherein: the second array includes a plurality of slices indexed by contingency and having size N×sk, wherein N is a number of the transactional nodes; and the third array includes a plurality of slices indexed by state and having size N×st, wherein st is a branch rank of the state; and further stores a fourth array common to the right and left power flow perturbation factor arrays, the fourth array including a plurality of slices indexed by state and contingency and having size st×sk.

Example 13 includes the subject matter of any of Examples 1-12, and further specifies that: I is a first number of monitored branches in the electrical power grid; N is a second number of the transactional nodes; and for a given state of the states and a given contingency of a plurality of contingencies: sk is a rank of the given contingency; the right flow perturbation factor arrays include at least one slice having size N×sk; and the left flow perturbation factor arrays include at least one slice having size I×sk.

Example 14 includes the subject matter of any of Examples 1-13, and further specifies that the third instructions, upon execution, further: determine sensitivities of power flow, in monitored branches of the electrical power grid, to changes in the power injection at respective transactional nodes; and cause an array of the sensitivities to be outputted.

Example 15 includes the subject matter of any of Examples 1-14, and further specifies that the stored instructions further include fourth instructions that, when executed, cause the one or more hardware processors to: receive data from sensors of the electrical power grid indicating outage or status of one or more components of the electrical power grid; derive configuration data describing the electrical power grid from the received data; and store the configuration data; wherein the computing of the right and left power flow perturbation factor arrays is dependent on the stored configuration data.

Example 16 is a system, including: one or more hardware processors with memory coupled thereto; and computer-readable storage media with instructions which, when executed by the one or more hardware processors, cause the system to perform operations including: obtaining one or more first factors of a reference bus admittance matrix of an electrical power grid; computing right and left power flow perturbation factor arrays for each of a plurality T of states of the electrical power grid based on: the one or more first factors; and one or more perturbation definition arrays characterizing perturbations of the electrical power grid for the respective state; and combining the right and left power flow perturbation factor arrays with a plurality of candidate solutions, (i) to determine violations of one or more component limits in the electrical power grid, and (ii) to cause a list of the violations to be outputted, wherein each of the candidate solutions includes a vector of power injections at transactional nodes of the electrical power grid.

Example 17 includes the subject matter of Example 16, and further specifies that the perturbation definition arrays define perturbations of the electrical power grid for the states and for a plurality of contingencies.

Example 18 includes the subject matter of any of Examples 16-17, and further specifies that the right and left power flow perturbation factor arrays are reused on multiple iterations of the combining operation on successive sets of candidate solutions to obtain respective feasible solutions for the states.

Example 19 includes the subject matter of Example 18, and further specifies that the system is further configured to control magnitudes of power injection at the transactional nodes of the electrical power grid in the states according to the respective feasible solutions.

Example 20 is a computer-implemented method for an electrical power grid subject to perturbations characterized by respective states and/or contingencies, including: in a precompute phase: decomposing a reference bus admittance matrix A0 of the electrical power grid to obtain at least one factor of A0; computing a first intermediate array having slices of size J×sp and a second intermediate array having slices of size sp×sp, the slices of each intermediate array including: first slices indexed by state; and second slices indexed by both state and contingency; wherein: each slice of the first and second slices pertains to a respective perturbation; J is a number of buses in the electrical power grid; and sp is a branch rank of the respective perturbation; computing, based on the at least one factor and the intermediate arrays, right and left power flow perturbation factor arrays including third slices indexed by state and fourth slices indexed by both state and contingency; and storing the right and left power flow perturbation factor arrays; wherein the right and left power flow perturbation factor arrays are combinable with candidate solutions for the electrical power grid in the respective states (i) to determine violations in the electrical power grid for the candidate solutions, each candidate solution including a vector of power injections at transactional nodes of the electrical power grid, (ii) to determine feasible solutions among the candidate solutions, and (iii) to control magnitudes of power injection at the transactional nodes according to the feasible solutions in the respective states.

Example 21 includes the subject matter of Example 20, and further includes: subsequent to the precompute phase: combining the right and left power flow perturbation factor arrays with successive sets of the candidate solutions to determine violations in the electrical power grid and feasible solutions for the respective states; and transmitting signals to control magnitudes of power injection at the transactional nodes in the respective states according to the feasible solutions.

Example 22 includes the subject matter of any of Examples 20-21, and further includes: combining a first one of the candidate solutions for a first one of the states with respective arrays of the right and left power flow perturbation factor arrays, to determine at least one base case violation in the electrical power grid.

Example 23 includes the subject matter of any of Examples 20-22, and further includes: responsive to determining an absence of base case violations for a first one of the candidate solutions for a first one of the states: combining the first candidate solution with respective arrays of the right and left power flow perturbation factor arrays, to determine at least one violation for a respective contingency in the first state.

XVII. A Generalized Computing Environment

Figure 8:
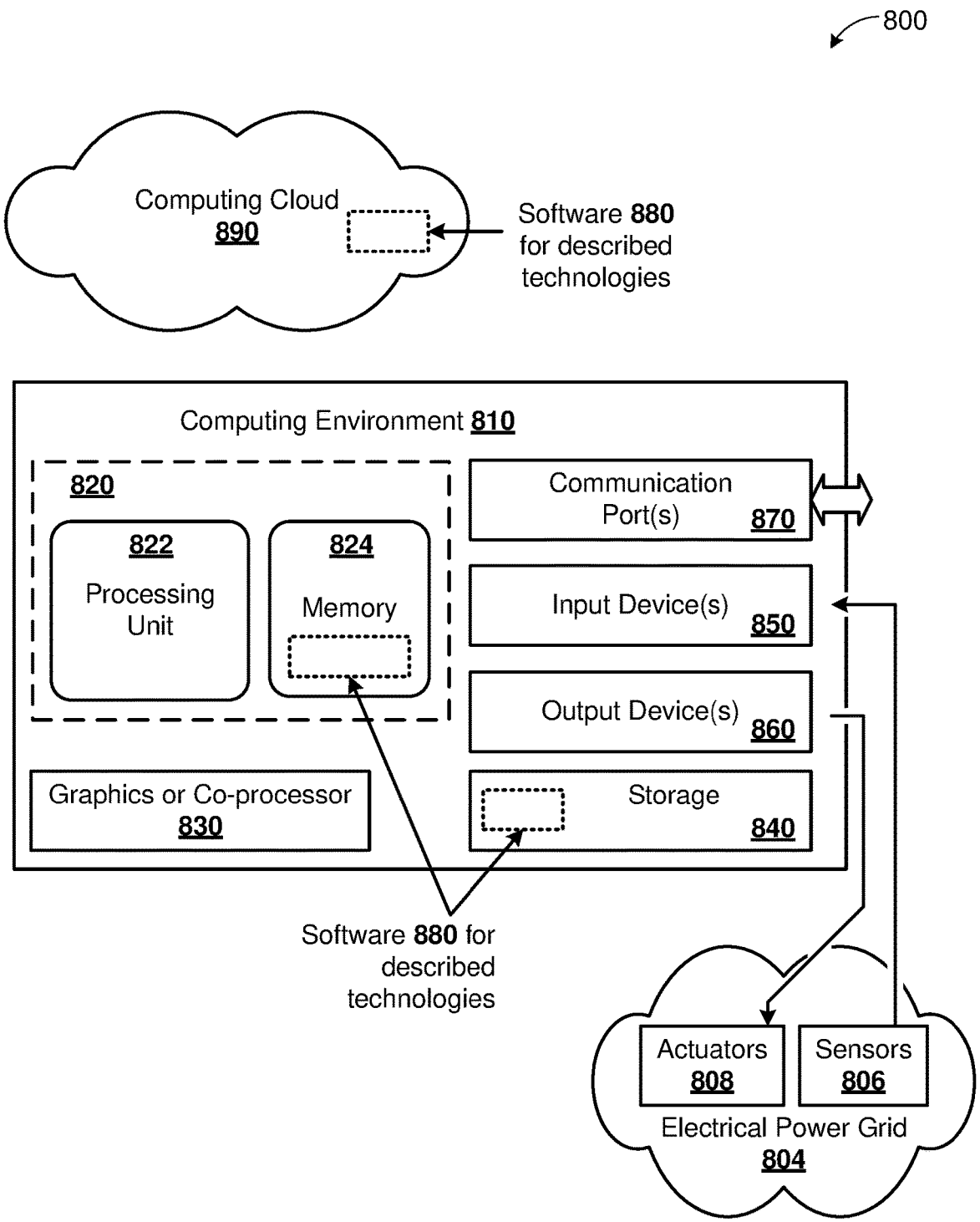
FIG. 8 illustrates a generalized example of a suitable computing environment in which described embodiments, techniques, and technologies can be implemented.

FIG. 8 illustrates a generalized example of a suitable computing system 800 in which described examples, techniques, and technologies for SFT and applications for electrical power grids can be implemented. The computing system 800 is not intended to suggest any limitation as to scope of use or functionality of the present disclosure, as the innovations can be implemented in diverse general-purpose or special-purpose computing systems. The computing system 800 can precompute arrays used in SFT, evaluate SFT on candidate inputs, solve SCUC or SCED problems, communicate with SCUC or SCED solvers, communicate with other power grid components; or can acquire, process, output, or store data associated with SCUC, SFT, or planning or management for one or more electrical power grids as described herein.

With reference to FIG. 8, computing environment 810 includes one or more processing units 822 and memory 824. In FIG. 8, this basic configuration 820 is included within a dashed line. Processing unit 822 can execute computer-executable instructions, such as for control or data acquisition as described herein. Processing unit 822 can be a general-purpose central processing unit (CPU), a processor in an application-specific integrated circuit (ASIC), or any other type of processor. In a multi-processing system, multiple processing units execute computer-executable instructions to increase processing power. Computing environment 810 can also include a graphics processing unit or co-processing unit 830. Tangible memory 824 can be volatile memory (e.g., registers, cache, or RAM), non-volatile memory (e.g., ROM, EEPROM, or flash memory), or some combination thereof, accessible by processing units 822, 830. The memory 824 stores software 880 implementing one or more innovations described herein, in the form of computer-executable instructions suitable for execution by the processing unit(s) 822, 830. The memory 824 can also store configuration parameters, working data structures, intermediate data structures, output data structures, inter-process communication channel parameters, or database data. The memory 824 can also store configuration and operational data.

A computing system 810 can have additional features, such as one or more of storage 840, input devices 850, output devices 860, or communication ports 870. An interconnection mechanism (not shown) such as a bus, controller, or network interconnects the components of the computing environment 810. Typically, operating system software (not shown) provides an operating environment for other software executing in the computing environment 810, and coordinates activities of the components of the computing environment 810.

The tangible storage 840 can be removable or non-removable, and includes magnetic disks, magnetic tapes or cassettes, CD-ROMs, DVDs, or any other medium which can be used to store information in a non-transitory way and which can be accessed within the computing environment 810. The storage 840 stores instructions of the software 880 (including instructions and/or data) implementing one or more innovations described herein. Storage 840 can also store configuration data, data structures, or other databases.

The input device(s) 850 can be a mechanical, touch-sensing, or proximity-sensing input device such as a keyboard, mouse, pen, touchscreen, or trackball, a voice input device, a scanning device, or another device that provides input to the computing environment 810. In some examples, one or more of the input device(s) 850 can be coupled to sensors 806 of the electrical power grid 804. The input devices 850 can acquire state information (e.g. complete or partial outages, projected time for restoration, and so forth) for one or more components of the power grid (e.g. power lines, substation components, or switchgear) or for one or more external systems (e.g. loads, generators, or other interconnected power grids) coupled to the electrical power grid 804. The output device(s) 860 can be a display, printer, speaker, optical disk writer, or another device that provides output from the computing environment 810. Input or output can also be communicated to/from a remote device over a network connection, via communication port(s) 870. In some examples, one or more of the output device(s) 860 can be coupled to actuators 808 of the electrical power grid 804. The output devices can control one or more components of the electrical power grid 804, e.g. to enable or disable such components, or to control power injection to or from loads or generators coupled to the electrical power grid 804.

The communication port(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 800 can also include a computing cloud 890 in which instructions implementing all or a portion of the disclosed technology are executed. Any combination of memory 824, storage 840, and computing cloud 890 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computing system," "computing environment," and "computing device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

XVIII. Example Cloud Computing Environment

Figure 9:
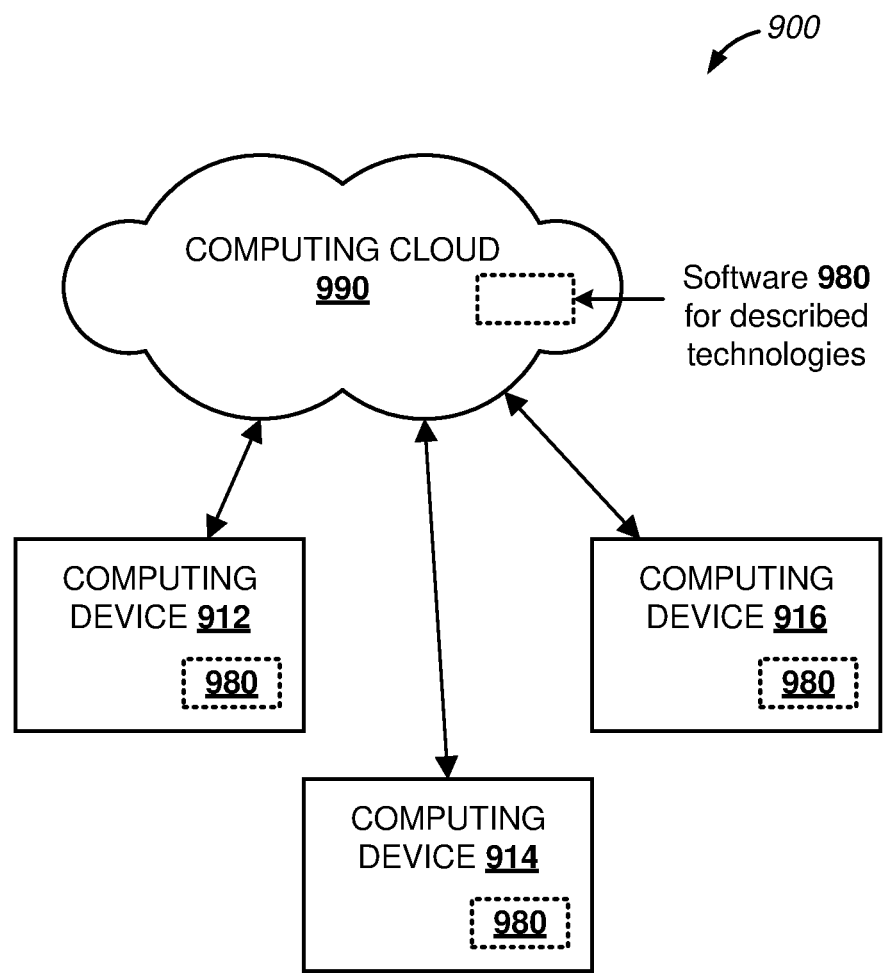
FIG. 9 is a diagram schematically depicting computing devices operating in conjunction with a computing cloud for implementation of disclosed technologies.

FIG. 9 depicts an example cloud computing environment 900 in which the described technologies can be implemented. The cloud computing environment 900 comprises a computing cloud 990 containing resources and providing services. The computing cloud 990 can comprise various types of cloud computing resources, such as computer servers, data storage repositories, networking resources, and so forth. The computing cloud 990 can be centrally located (e.g., provided by a data center of a business or organization) or distributed (e.g., provided by various computing resources located at different locations, such as different data centers and/or located in different cities or countries).

The computing cloud 990 can be operatively connected to various types of computing devices (e.g., client computing devices), such as computing devices 912, 914, and 916, and can provide a range of computing services thereto. One or more of computing devices 912, 914, and 916 can be computers (e.g., server, virtual machine, embedded systems, desktop, or laptop computers), mobile devices (e.g., tablet computers, smartphones, or wearable appliances), or other types of computing devices. Connections between computing cloud 990 and computing devices 912, 914, and 916 can be over wired, wireless, or optical links, or any combination thereof, and can be short-lived or long-lasting. These connections can be stationary or can move over time, being implemented over varying paths and having varying attachment points at each end. Computing devices 912, 914, and 916 can also be connected to each other.

Computing devices 912, 914, and 916 can utilize the computing cloud 990 to obtain computing services and perform computing operations (e.g., data processing, data storage, and the like). Particularly, software 980 for performing the described innovative technologies can be resident or executed in the computing cloud 990, in computing devices 912, 914, and 916, or in a distributed combination of cloud and computing devices.

XIX. General Considerations

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the terms "or" or "and/or" mean any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods.

Additionally, the description sometimes uses terms like "access," "block," "calculate," "call," "combine," "compute," "decompose," "determine," "evaluate," "factorize," "generate," "issue," "iterate," "multiply," "obtain," "optimize," "output," "perform," "precompute," "produce," "receive," "return," "satisfy," "search," "send," "solve," "stack," "store," "terminate," "transmit," "update," or "violate," to describe the disclosed methods. These terms are high-level descriptions of the actual operations that are performed, or determinations that are made, by one or more computers. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable media include memory 824, and storage 840. The terms computer-readable media or computer-readable storage media do not include signals and carrier waves. In addition, the terms computer-readable media or computer-readable storage media do not include communication ports (e.g., 870) or communication media.

Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer), on a distributed computer (e.g. in a high-performance computing (HPC) environment), or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ASP.net, B #, C, C++, C #, Curl, Dart, Erlang, Fortran, Go, Java, JavaScript, Julia, Lisp, Matlab, Octave, Perl, PHP, Python, R, Ruby, Rust, SAS, SPSS, WebAssembly, any derivatives thereof, or any other suitable programming language, or, in some examples, markup languages such as HTML or XML, or in any combination of suitable languages, libraries, or packages. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to a power grid market coordination server or another computing device.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. A computer-implemented method for an electrical power grid subject to perturbations characterized by respective states and/or contingencies, the method comprising:
   in a precompute phase:
   decomposing a reference bus admittance matrix A0 of the electrical power grid to obtain at least one factor of A0;
   computing a first intermediate array having slices of size J×sp and a second intermediate array having slices of size sp×sp, the slices of each intermediate array comprising:
   first slices indexed by state; and
   second slices indexed by both state and contingency;

wherein:
each slice of the first and second slices pertains to a respective perturbation;
J is a number of buses in the electrical power grid; and
sp is a branch rank of the respective perturbation;
computing, based on the at least one factor and the intermediate arrays, right and left power flow perturbation factor arrays comprising third slices indexed by state and fourth slices indexed by both state and contingency; and
storing the right and left power flow perturbation factor arrays;
wherein the right and left power flow perturbation factor arrays are combinable with candidate solutions for the electrical power grid in the respective states (i) to determine violations in the electrical power grid for the candidate solutions, each candidate solution comprising a vector of power injections at transactional nodes of the electrical power grid, (ii) to determine feasible solutions among the candidate solutions, and (iii) to control magnitudes of power injection at the transactional nodes according to the feasible solutions in the respective states.

2. The computer-implemented method of claim 1, further comprising:
subsequent to the precompute phase:
combining the right and left power flow perturbation factor arrays with successive sets of the candidate solutions to determine violations in the electrical power grid and feasible solutions for the respective states; and
transmitting signals to control magnitudes of power injection at the transactional nodes in the respective states according to the feasible solutions.

3. The computer-implemented method of claim 1, further comprising:
combining a first one of the candidate solutions for a first one of the states with respective arrays of the right and left power flow perturbation factor arrays, to determine at least one base case violation in the electrical power grid.

4. The computer-implemented method of claim 1, further comprising:
responsive to determining an absence of base case violations for a first one of the candidate solutions for a first one of the states:
combining the first candidate solution with respective arrays of the right and left power flow perturbation factor arrays, to determine at least one violation for a respective contingency in the first state.

5. One or more computer-readable media comprising stored instructions executable by one or more hardware processors for feasibility testing on a plurality T of candidate solutions for an electrical power grid, wherein the candidate solutions are indexed by T respective states of the electrical power grid, and the stored instructions comprise:
first instructions that, upon execution, obtain one or more first factors of a reference bus admittance matrix of the electrical power grid;
second instructions that, upon execution, compute right and left power flow perturbation factor arrays for each of the T states based on:
the one or more first factors; and
one or more perturbation definition arrays characterizing perturbations of the electrical power grid for the respective state; and third instructions that, upon execution, combine the right and left power flow perturbation factor arrays with the candidate solutions, to (i) determine violations of one or more component limits in the electrical power grid, and (ii) cause a list of the violations to be outputted, wherein each of the candidate solutions comprises a vector of power injections at transactional nodes of the electrical power grid.

6. The one or more computer-readable media of claim 5, wherein the stored instructions further comprise:
fourth instructions that, upon execution after multiple iterations of the third instructions, result in respective feasible solutions for the states, and cause the electrical power grid to control magnitudes of power injection at the transactional nodes of the electrical power grid in the states according to the respective feasible solutions.

7. The one or more computer-readable media of claim 5, wherein the states are respective future time intervals.

8. The one or more computer-readable media of claim 5, wherein the perturbation definition arrays define perturbations of the electrical power grid in the states and in a plurality of contingencies, and comprise first arrays indexed by the states and second arrays indexed by the contingencies independent of the states.

9. The one or more computer-readable media of claim 8, wherein the perturbations of the electrical power grid are completely defined by the first arrays and the second arrays.

10. The one or more computer-readable media of claim 8, wherein the perturbation definition arrays comprise:
first branch admittance perturbation arrays indexed by the states;
second branch admittance perturbation arrays indexed by the contingencies;
first topology perturbation arrays indexed by the states; and
second topology perturbation arrays indexed by the contingencies.

11. The one or more computer-readable media of claim 8, wherein:
the perturbation definition arrays further comprise third topology perturbation arrays indexed by both respective states of the states and respective contingencies of the contingencies, each of the third topology perturbation arrays comprising a plurality of slices for respective combinations of one of the states and one of the contingencies;
at least a positive integer number K of the contingencies are tested for each of the T states; and
a number of the slices is less than or equal to $T \times \lfloor K/2 \rfloor$.

12. The one or more computer-readable media of claim 5, wherein the execution of the first instructions performs Cholesky decomposition of the reference bus admittance matrix.

13. The one or more computer-readable media of claim 5, wherein:
I is a first number of monitored branches in the electrical power grid;
J is a second number of buses in the electrical power grid; and
all calculations involving matrices of size $I \times J$ or size $J \times J$ are included in the first instructions.

14. The one or more computer-readable media of claim 5, wherein the execution of the second instructions further computes respective intermediate arrays having slices of size $J \times st$ for each of the T states, wherein J is a number of busses in the electrical power grid and st is a branch rank of perturbations to the electrical power grid in the respective state.

15. The one or more computer-readable media of claim 14, wherein the execution of the second instructions further computes intermediate arrays having slices of size J×sk for respective combinations of a state of the T states and a contingency, of a plurality of contingencies, having branch rank sk.

16. The one or more computer-readable media of claim 5, wherein the execution of the second instructions:
further stores a first array of the left power flow perturbation factor arrays, the first array comprising a plurality of slices indexed by contingency and having size size J×sk, wherein J is a number of buses in the electrical power grid and sk is a branch rank of the contingency;
further stores second and third arrays of the right power flow perturbation factor arrays, wherein:
the second array comprises a plurality of slices indexed by contingency and having size N×sk, wherein N is a number of the transactional nodes; and
the third array comprises a plurality of slices indexed by state and having size N×st, wherein st is a branch rank of the state; and
further stores a fourth array common to the right and left power flow perturbation factor arrays, the fourth array comprising a plurality of slices indexed by state and contingency and having size st×sk.

17. The one or more computer-readable media of claim 5, wherein:
I is a first number of monitored branches in the electrical power grid;
N is a second number of the transactional nodes; and
for a given state of the states and a given contingency of a plurality of contingencies:
sk is a rank of the given contingency;
the right flow perturbation factor arrays comprise at least one slice having size N×sk; and
the left flow perturbation factor arrays comprise at least one slice having size I×sk.

18. The one or more computer-readable media of claim 5, wherein the third instructions, upon execution, further:
determine sensitivities of power flow, in monitored branches of the electrical power grid, to changes in the power injection at respective transactional nodes; and
cause an array of the sensitivities to be outputted.

19. The one or more computer-readable media of claim 5, wherein the stored instructions further comprise fourth instructions that, when executed, cause the one or more hardware processors to:
receive data from sensors of the electrical power grid indicating outage or status of one or more components of the electrical power grid;
derive configuration data describing the electrical power grid from the received data; and
store the configuration data;
wherein the computing of the right and left power flow perturbation factor arrays is dependent on the stored configuration data.

20. A system comprising:
one or more hardware processors with memory coupled thereto; and
computer-readable storage media with instructions which, when executed by the one or more hardware processors, cause the system to perform operations comprising:
obtaining one or more first factors of a reference bus admittance matrix of an electrical power grid;
computing right and left power flow perturbation factor arrays for each of a plurality T of states of the electrical power grid based on:
the one or more first factors; and
one or more perturbation definition arrays characterizing perturbations of the electrical power grid for the respective state; and
combining the right and left power flow perturbation factor arrays with a plurality of candidate solutions, (i) to determine violations of one or more component limits in the electrical power grid, and (ii) to cause a list of the violations to be outputted, wherein each of the candidate solutions comprises a vector of power injections at transactional nodes of the electrical power grid.

21. The system of claim 20, wherein the perturbation definition arrays define perturbations of the electrical power grid for the states and for a plurality of contingencies.

22. The system of claim 20, wherein the right and left power flow perturbation factor arrays are reused on multiple iterations of the combining operation on successive sets of candidate solutions to obtain respective feasible solutions for the states.

23. The system of claim 22, wherein the system is further configured to control magnitudes of power injection at the transactional nodes of the electrical power grid in the states according to the respective feasible solutions.

* * * * *